United States Patent
Chang et al.

(10) Patent No.: US 11,089,215 B2
(45) Date of Patent: Aug. 10, 2021

(54) PANORAMIC IMAGE SYSTEM AND DRIVER ASSISTANCE SYSTEM

(71) Applicant: ABILITY OPTO-ELECTRONICS TECHNOLOGY CO.LTD., Taichung (TW)

(72) Inventors: Yeong-Ming Chang, Taichung (TW);
Chien-Hsun Lai, Taichung (TW);
Yi-Chi Cheng, Taichung (TW);
Tzu-Hsuan Wei, Taichung (TW);
Yao-Wei Liu, Taichung (TW)

(73) Assignee: ABILITY OPTO-ELECTRONICS TECHNOLOGY CO.LTD., Taichung (TW)

( * ) Notice: Subject to any disclaimer, the term of this patent is extended or adjusted under 35 U.S.C. 154(b) by 84 days.

(21) Appl. No.: 16/555,421

(22) Filed: Aug. 29, 2019

(65) Prior Publication Data
US 2020/0112678 A1   Apr. 9, 2020

Related U.S. Application Data

(60) Provisional application No. 62/743,155, filed on Oct. 9, 2018.

(51) Int. Cl.
*H04N 5/232* (2006.01)
*G06T 7/11* (2017.01)
(Continued)

(52) U.S. Cl.
CPC ....... *H04N 5/23238* (2013.01); *G06T 3/0062* (2013.01); *G06T 7/11* (2017.01);
(Continued)

(58) Field of Classification Search
CPC .. H04N 5/23238; H04N 5/23293; G06T 7/11; G06T 7/90; G06T 7/97; G06T 3/0062;
(Continued)

(56) References Cited

U.S. PATENT DOCUMENTS

| 10,151,904 | B2* | 12/2018 | Lee | G02B 13/06 |
| 2010/0020170 | A1* | 1/2010 | Higgins-Luthman | B60Q 1/143 348/135 |
| 2016/0044284 | A1* | 2/2016 | Goseberg | G06F 3/012 348/148 |

FOREIGN PATENT DOCUMENTS

| CN | 106918963 A | 7/2017 |
| CN | 107991821 A | 7/2017 |
| CN | 107529045 A | 12/2017 |

OTHER PUBLICATIONS

Office Action dated Apr. 2, 2021 in Chinese Application No. 201910441472.3, 6 pages.

* cited by examiner

*Primary Examiner* — John B Strege
(74) *Attorney, Agent, or Firm* — Muncy, Geissler, Olds & Lowe, P.C.

(57) ABSTRACT

A panoramic image system includes at least two camera modules, at least two display elements, and an image processor. Each of the camera modules takes a rear field of view or side field of view to obtain a view image. Each of the display elements displays each of the view images, and each of the view images is configured to have an overlapping region. The image processor receives each of the view images and pieces each of the view images into a panoramic image according to each of the overlapping regions. Each of the display elements selectively displays the panoramic image partially or displays the panoramic image entirely according to a region of interest by a user's observation. The panoramic image system may be applied to a vehicle-monitoring system to assist the driver in viewing the traffic conditions behind the vehicle.

22 Claims, 13 Drawing Sheets

(51) Int. Cl.
*G06T 3/00* (2006.01)
*G06T 7/90* (2017.01)
*G06T 11/00* (2006.01)
*G06T 7/00* (2017.01)

(52) U.S. Cl.
CPC .................. *G06T 7/90* (2017.01); *G06T 7/97* (2017.01); *G06T 11/001* (2013.01); *G06T 2207/20104* (2013.01); *G06T 2207/20212* (2013.01); *G06T 2207/30261* (2013.01)

(58) Field of Classification Search
CPC ......... G06T 11/001; G06T 2207/30261; G06T 2207/20104; G06T 2207/20212; G02B 13/18; G02B 13/004; G02B 13/0045; G06K 9/00791; G03B 37/04; G02F 1/153; G02F 1/1334; G02F 1/163; G02F 1/167; B60R 1/00; B60R 2300/8066
See application file for complete search history.

(a)

(b)

(a)

(b)

PANORAMIC IMAGE SYSTEM AND DRIVER ASSISTANCE SYSTEM

CROSS-REFERENCE TO RELATED APPLICATION

This application claims priority to and the benefit of, pursuant to 35 U.S.C. § 119, U.S. provisional patent application Ser. No. 62/743,155 filed on Oct. 9, 2018, the disclosure of which is incorporated herein in its entirety by reference.

BACKGROUND OF THE INVENTION

1. Field of the Invention

The present invention relates to a panoramic image system and driver assistance system which piece a panoramic image to facilitate a driver to view traffic conditions behind the automobile by utilizing a camera module and an image processor.

2. Description of the Related Art

With public transportation becoming more and more popular, vehicles, such as scooters, buses, cars, and the like, often provided with rear-view mirrors, travel on roads in cities with dense population. However, traffic accidents often occur due to the problem of blind spots stemming from the size or placement of the rear-view mirrors. Moreover, because the body structures of cars, buses, or much larger vehicles are wider, which may block the driver's vision, the visible range of the rear-view mirrors may also be limited. This disadvantages the driver when making the judgment on the distance, speed, and direction of the cars coming behind, leading to a misjudgment by the driver. As a consequence, the cars coming behind may collide with or crash on the driver's vehicle, causing traffic accidents.

Currently, automobile monitoring systems on the market mostly adopt a radar or supersonic wave, and the audio prompt or digital band is used to remind the driver to notice the cars coming behind. Still, the driver may not know the distance from the cars coming behind, making the driver fail to have enough time to think and respond instantly.

Accordingly, the inventor of the present invention has designed a panoramic image system and driver assistance system in an effort to overcome deficiencies in terms of current techniques so as to enhance the implementation and application in industries.

SUMMARY OF THE INVENTION

In view of the conventional problems as mentioned above, the present invention aims to provide a panoramic image system and driver assistance system to tackle the issue encountered in the prior art.

On the basis of the aforementioned purpose, the present invention provides a panoramic image system, including at least two camera modules, at least two display elements, and an image processor. Each of the camera modules includes a camera lens and an optical image sensor. The optical image sensor is disposed on an optical axis of the camera lens and takes an image at a rear field of view or at least takes the image at a side field of view or a front field of view to obtain a view image. Each of the display elements is respectively electrically connected to each of the optical image sensors to display each of the view images, and each of the view images is configured to have an overlapping region. The image processor is electrically connected to each of the optical image sensors and each of the display elements, receives each of the view images, and pieces each of the view images into a panoramic image according to each of the overlapping regions. A more complete rear-view image may be provided for the driver so that the driver may easily determine the current traffic conditions.

Preferably, each of the display elements selectively displays the panoramic image partially or displays the panoramic image entirely according to a region of interest by observation.

Preferably, each of the display elements adjusts brightness of each of the view images according to image brightness of shooting of each of the camera modules.

Preferably, each of the camera lenses has at least three lenses with refractive power.

Preferably, each of the camera lenses satisfies the following conditions:

$1.0 \le f/HEP \le 10.0;$ $0 \text{ deg} \le HAF \le 150 \text{ deg};$ $0 \text{ mm} \le PhiD \le 18 \text{ mm};$ $0 \le PhiA/PhiD \le 0.99;$ and $0.9 \le 2(ARE/HEP) \le 2.0;$ wherein f is a focal length of the camera lens; HEP is an entrance pupil diameter of the camera lens; HAF is a half maximum field of view of the camera lens; PhiD is a maximum value of a minimum side length of an outer periphery of a lens base vertical to an optical axis of the camera lens; PhiA is a maximum effective diameter of the camera lens nearest to a lens surface of an image plane; ARE is an arc length along an outline of the lens surface, starting from an intersection point of any lens surface of any lens and the optical axis in the camera lens, and ending at a point with a vertical height which is a distance from the optical axis to half the entrance pupil diameter.

Preferably, a horizontal field of view taken by each of the camera modules is a value between 45 degrees and 220 degrees.

Preferably, each of the display elements is an electrochromic mirror and is electrically connected to the image processor, and each of the electrochromic mirrors includes a display panel, a semi-reflecting mirror, an electro-optical switch, and a transparent substrate. The semi-reflecting mirror is disposed on the display panel. The electro-optical switch is disposed on the semi-reflecting mirror, and the electro-optical switch changes a transmittance thereof according to a control signal of the image processor in order to obstruct a travel route of light or to make the light pass through the electro-optical switch. The transparent substrate is disposed on the electro-optical switch.

Preferably, the transparent substrate is an element that firstly interacts with the light when the light is incident and presents a surrounding environment of the electrochromic mirror.

Preferably, each of the electro-optical switches includes a first substrate, a first transparent conductive layer, an auxiliary electrode layer, an electrolyte layer, an electrochromic layer, a second transparent conductive layer, and a second substrate. The first transparent conductive layer is disposed on the first substrate, the auxiliary electrode layer is disposed on the first transparent conductive layer, the electrolyte layer is disposed on the auxiliary electrode layer, the electrochromic layer is disposed on the electrolyte layer, the second transparent conductive layer is disposed on the electrochromic layer, and the second substrate is disposed on the second transparent conductive layer.

Preferably, the first substrate or the second substrate is adjacent to the transparent substrate.

Preferably, each of the electro-optical switches further includes a sealing structure; the sealing structure is disposed between the first substrate and the second substrate and surrounds the first transparent conductive layer, the auxiliary electrode layer, the electrolyte layer, the electrochromic layer, and the second transparent conductive layer.

Preferably, materials of the electrochromic layer include a transition metal oxide, an intercalated compound, an organic compound, and any combination thereof.

Preferably, each of the electro-optical switches includes a first substrate, a first transparent conductive layer, a light-shielding layer, a second transparent conductive layer, and a second substrate. The first transparent conductive layer is disposed on the first substrate, the light-shielding layer is disposed on the first transparent conductive layer, the second transparent conductive layer is disposed on the light-shielding layer, and the second substrate is disposed on the second transparent conductive layer.

Preferably, the first substrate or the second substrate is adjacent to the transparent substrate.

Preferably, each of the electro-optical switches further includes a sealing structure; the sealing structure is disposed between the first substrate and the second substrate and surrounds the first transparent conductive layer, the light-shielding layer, and the second transparent conductive layer.

Preferably, materials of the light-shielding layer include suspended particles, a polymer dispersed liquid crystal, and any combination thereof.

Preferably, when the image processor sends a control signal having a first voltage to each of the electro-optical switches, each of the electro-optical switches obstructs the travel route of the light; when the image processor sends a control signal having a second voltage to each of the electro-optical switches, the light passes through each of the electro-optical switches.

Preferably, the image processor adjusts the second voltage according to image brightness of shooting of each of the camera modules in order to adjust the transmittance of the electro-optical switch.

Preferably, when image brightness of shooting of the camera module is greater than a threshold value, the image processor sends a control signal having a first voltage to each of the electro-optical switches, each of the electro-optical switches obstructs the travel route of the light, and the display panel displays the panoramic image pieced by the image processor.

A driver assistance system includes at least two camera modules, at least two display elements, and an image processor. Each of the camera modules includes a camera lens and an optical image sensor. The optical image sensor is disposed on an optical axis of the camera lens and takes an image at a rear field of view or takes the image at a side field of view to obtain a view image. Each of the display elements is respectively electrically connected to each of the optical image sensors to display each of the view images, and each of the view images is configured to have an overlapping region. The image processor is electrically connected to each of the optical image sensors and each of the display elements, receives each of the view images, and pieces each of the view images into a panoramic image according to each of the overlapping regions. The image processor determines that a vehicle or a pedestrian of the panoramic image approaches or stays away from a driving vehicle according to the panoramic image. This enables the driver to instantly know the relative position of the cars coming behind, thus preventing traffic accidents.

Preferably, when the image processor determines that a relative distance between the vehicle or the pedestrian of the panoramic image and the driving vehicle is within a critical range, the vehicle or the pedestrian of the panoramic image approaches the driving vehicle.

Preferably, when the image processor determines that a relative distance between the vehicle or the pedestrian of the panoramic image and the driving vehicle is outside a critical range, the vehicle or the pedestrian of the panoramic image stays away from the driving vehicle.

Preferably, when the image processor determines that a relative speed between the vehicle or the pedestrian of the panoramic image and the driving vehicle is greater than zero, the vehicle or the pedestrian of the panoramic image approaches the driving vehicle.

Preferably, when the image processor determines that a relative speed between the vehicle or the pedestrian of the panoramic image and the driving vehicle is smaller than zero, the vehicle or the pedestrian of the panoramic image stays away from the driving vehicle.

One advantage of the aforementioned embodiment is that the panoramic image system of the present invention provides the driver with a more complete rear-view image through the establishment of the panorama image such that the driver may easily determine the current traffic conditions.

Another advantage of the aforementioned embodiment is that the panoramic image system of the present invention chooses to display the panoramic image on the display panel by using the disposition of the electro-optical switch and the determination on the image brightness of shooting or to display the image of the surrounding environment by using the transparent substrate, thus helping the driver to view rear images or side images.

The other advantage of the aforementioned embodiment is that the driver assistance system of the present invention allows the driver to instantly know the relative position of the cars coming behind through the establishment of the panoramic image and the relative position and speed of a vehicle or a pedestrian in the panoramic image with the driving vehicle, thus preventing traffic accidents.

DESCRIPTION OF THE PREFERRED EMBODIMENTS

The advantages, features, and technical methods of the present invention are to be described in detail with reference to the exemplary embodiments and the accompanying drawings for the purpose of being more easily understood. Moreover, the present invention may be realized in different forms, and should not be construed as being limited to the embodiments set forth herein. Conversely, for a person of ordinary skill in the art, the embodiments provided shall make the present invention convey the scope more thoroughly, comprehensively, and completely. In addition, the present invention shall be defined only by the appended claims.

Figure 1:
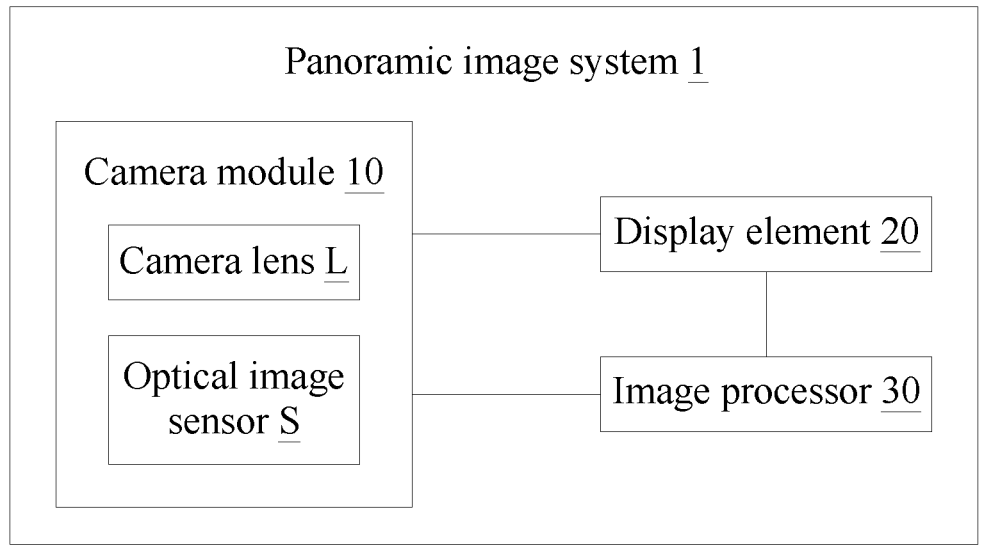
FIG. 1 depicts a block diagram of the panoramic image system according to the present invention.

Please refer to FIG. 1 which depicts a block diagram of the panoramic image system according to the present invention. As shown in FIG. 1, the present invention provides a panoramic image system, including at least two camera modules 10, at least two display elements 20, and an image processor 30. A horizontal field of view taken by each of the camera modules 10, which includes a camera lens L' and an optical image sensor S, is a value between 45 degrees and 220 degrees. The optical image sensor S is disposed on an optical axis of the camera lens L and takes an image at a rear field of view or at least takes the image at a side field of view or a front field of view to obtain a view image. Each of the display elements 20 is disposed in accordance with each of the camera module 10 and respectively electrically connected to each of the optical image sensors S to display each of the view images, and each of the view images is configured to have an overlapping region. The image processor 30 is electrically connected to each of the optical image sensors S and each of the display elements 20, receives each of the view images, and pieces each of the view images into a panoramic image according to each of the overlapping regions. A more complete rear-view image may be provided for the driver so that the driver may easily determine the current traffic conditions.

The side field of view, the front field of view, and the rear field of view are defined according to the basis for the position of the driver. Specifically, the side field of view refers to the left or right side of the driver's position; the front field of view refers to the front side of the driver's position; the rear field of view refers to the rear of the driver's position. Hence, the view image may be the rear-view image of the rear of the driver, the side-view image of the left or right side of the driver, or the front-view image of the front side of the driver. The above is for illustrative purposes only and is not intended to limit the scope of the present invention.

Wherein, each of the display elements 20 selectively displays the panoramic image partially or displays the panoramic image entirely according to a region of interest by the user's observation, making the image viewed by the driver more comprehensive. Each of the display elements adjusts the brightness of each of the view images according to image brightness of shooting of each of the camera modules 10, allowing the driver to view the view image or the panoramic image more comfortably without experiencing glare and dizziness. In addition, the number of camera modules 10 and display elements 20 is changed according to users' needs and engineers' needs for the design. The number of camera modules 10 and display elements 20 is not limited herein.

Herein, the establishment of the panoramic image is illustrated in detail as follows: (1) According to the photographing point of each of the camera modules 10, a person or an object that does not change in each of the view images is selected. (2) According to the person or the object that does not change in each of the view images, the overlapping region of each of the view images may be matched so as to select the view image with the common overlapping region. (3) A corresponding characteristic vector of the view image having the common overlapping region may be calculated to obtain a corresponding homography matrix by using the random sample consensus algorithm. (4) According to each of the homography matrices, each of the view images may be pieced into a panoramic image.

Figure 2:
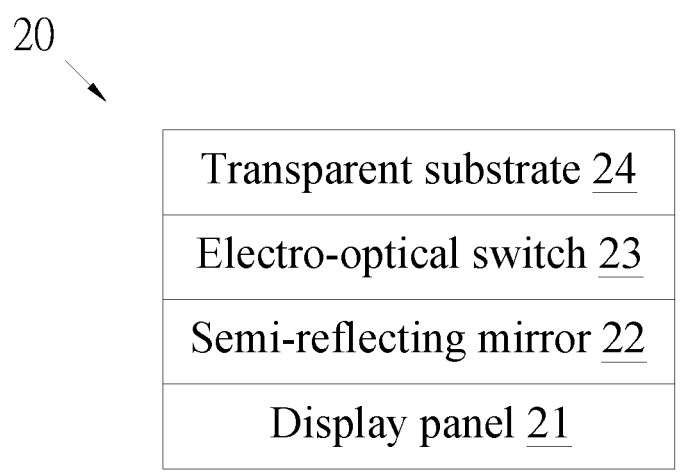
FIG. 2 depicts a structural diagram of the display element of the panoramic image system according to the present invention.

Please refer to FIG. 2 which depicts a structural diagram of the display element of the panoramic image system according to the present invention. As shown in FIG. 2, each of the display elements 20 is an electrochromic mirror and is electrically connected to the image processor 30, and each of the electrochromic mirrors includes a display panel 21, a semi-reflecting mirror 22, an electro-optical switch 23, and a transparent substrate 24. The semi-reflecting mirror 22 is disposed on the display panel 21. The electro-optical switch 23 is disposed on the semi-reflecting mirror 22, and the electro-optical switch 23 changes a transmittance thereof according to a control signal of the image processor 30 in order to obstruct a travel route of light or to make the light pass through the electro-optical switch 23. The transparent substrate 24, a glass substrate, is disposed on the electro-optical switch 23. The transparent substrate 24 is an element that firstly interacts with the light when the light is incident and presents a surrounding environment of the electrochromic mirror. It should be noted that each of the display elements 20 may be an electrochromic mirror or a general display. Thus, in terms of the configuration of the display element 20, at least two display elements 20 may partially be an electrochromic mirror and partially be a general display, or may both be electrochromic mirrors or both be general displays. Other preferred dispositions may be made according to actual needs without being limited to the scope of the present invention.

Figure 3A:
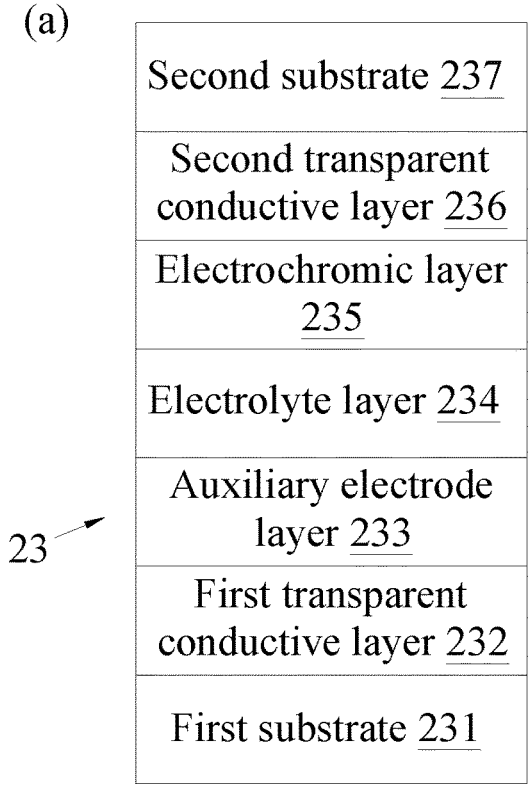
FIG. 3A depicts a structural diagram of the electro-optical switch of the panoramic image system according to the first embodiment of the present invention.
Figure 3A:
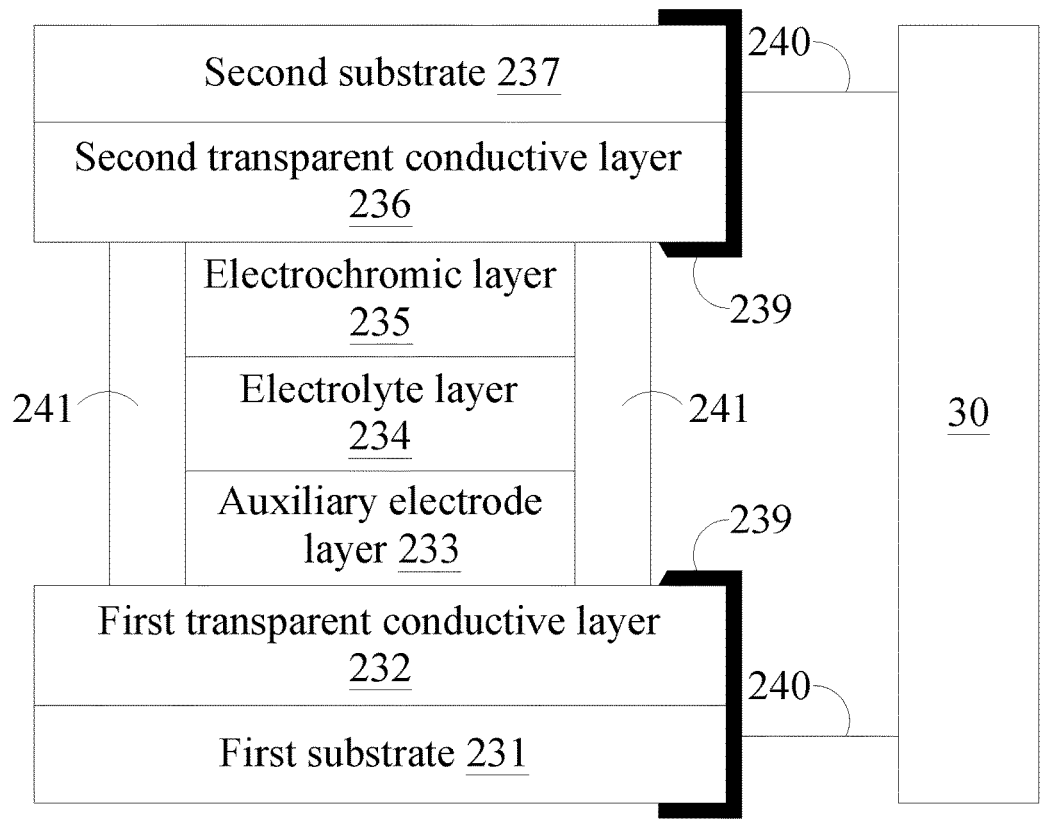

Please refer to FIG. 3A which depicts a structural diagram of the electro-optical switch of the panoramic image system according to the first embodiment of the present invention. FIG. 3A (a) depicts a layer structural diagram of the electro-optical switch of the panoramic image system according to the first embodiment of the present invention. As shown in FIG. 3A (a), a single electro-optical switch 23 of the present invention includes a first substrate 231, a first transparent conductive layer 232, an auxiliary electrode layer 233, an electrolyte layer 234, an electrochromic layer 235, a second transparent conductive layer 236, a second substrate 237, and a sealing structure 241. The first transparent conductive layer 232 is disposed on the first substrate 231. The auxiliary electrode layer 233 is disposed on the first transparent conductive layer 232. The electrolyte layer 234 is disposed on the auxiliary electrode layer 233. The electrochromic layer 235 is disposed on the electrolyte layer 234. The second transparent conductive layer 236 is disposed on the electrochromic layer 235. The second substrate 237 is disposed on the second transparent conductive layer 236. The sealing structure 241 is disposed between the first substrate 231 and the second substrate 237 and surrounds the auxiliary electrode layer 233, the electrolyte layer 234, and the electrochromic layer 235 in an attempt to prevent the solution in the electrolyte layer 234 from flowing out. FIG. 3A (b) depicts a cross-sectional diagram of the electro-optical switch of the panoramic image system according to the first embodiment of the present invention. As shown in FIG. 3A (b), U-shape electrodes 239 may be disposed on the electro-optical switch 23. The electrodes 239 may be formed by respectively cladding the end of the first substrate 231 and the first transparent conductive layer 232 as well as the end of the second substrate 237 and the second transparent conductive layer 236 by using metal foils. The image processor 30 may be electrically connected to the electrodes 239 via wires 240 so that voltage may be sent to the electro-optical switch 23. In an embodiment, the electrodes 239 may be formed outside of the sealing structure without overlapping with the auxiliary electrode layer 233, the electrolyte layer 234, and the electrochromic layer 235. In another embodiment, the electrode 239 overlaps the auxiliary electrode layer 233, the electrolyte layer 234, and the electrochromic layer 235.

Figure 3B:
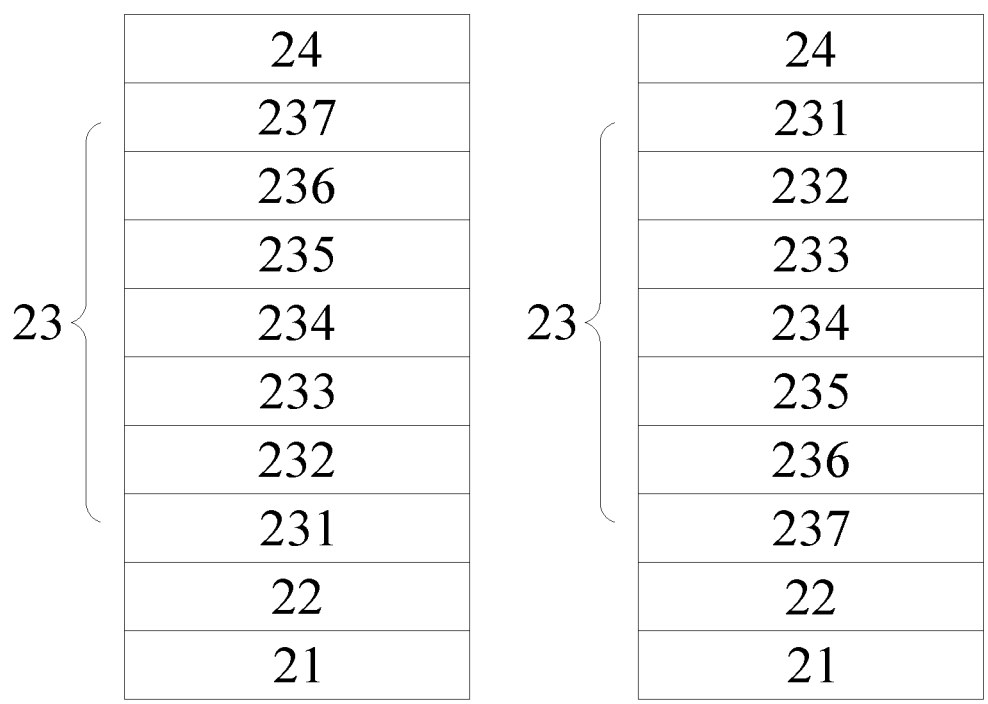
FIG. 3B depicts a structural diagram of the display element of the panoramic image system according to the first embodiment of the present invention.

Please refer to FIG. 3B which depicts a structural diagram of the display element of the panoramic image system according to the first embodiment of the present invention. In an embodiment, as shown in FIG. 3A and FIG. 3B, the first substrate 231 or the second substrate 237 of the electro-optical switch 23 in the display element 20 of the present invention is adjacent to the transparent substrate 24. That is, the stacking order in the electro-optical switch 23 may be adjusted according to actual needs. In another embodiment, the first substrate 231 or the second substrate 237 of the electro-optical switch 23 may be used as the transparent substrate 24 without the need for the transparent substrate 24 originally provided on the display element 20, thereby reducing the thickness of the display element 20.

Wherein, the electro-optical switch 23 of the present invention is described as follows: The first substrate 231 and the second substrate 237 may be selected from one of a glass substrate, a quartz substrate, a sapphire substrate, and a silicon carbide (SiC) substrate. The material of the first transparent conductive layer 232 and the second transparent conductive layer 236 includes indium tin oxide (ITO), zinc oxide (ZnO), aluminum gallium indium tin (AlGaInSnO), aluminum zinc oxide (AZO), tin oxide ($SnO_2$), indium oxide ($In_2O_3$), zinc tin oxide (SnZnO), or graphene. The material of the auxiliary electrode layer 233 includes nickel oxide ($NiO_x$), nickel hydroxide ($Ni(OH)_2$), or cobalt hydroxide ($Co(OH)_2$). The material of the electrolyte layer 234 includes an electrolyte composed of oxides such as zirconium dioxide ($ZrO_2$), cerium oxide ($HfO_2$), tantalum pentoxide ($Ta_2O_5$), and silicon oxide ($SiO_2$), and includes an electrolyte composed of salts such as calcium difluoride ($CaF_2$), magnesium difluoride ($MgF_2$), and cesium trifluoride ($CeF_3$). The material may also include an electrolyte composed of acids such as organic macromolecules like CPE (cross-linked polyether), PEO (poly (ethylene oxide)), PVA (poly (vinyl alcohol)), PVP (poly (vinyl piperidine)), and lithium perchlorate ($LiClO_4$) or phosphoric acid ($H_3PO_4$). The material of the electrochromic layer 235 includes at least one selected from the group consisting of transition metal oxides, intercalated compounds, and organic compounds. The transition metal oxides include tungsten trioxide ($WO_3$), vanadium pentoxide ($V_2O_5$), nickel oxide ($NiO_x$), molybdenum trioxide ($MoO_3$), niobium pentoxide ($Nb_2O_5$), titanium dioxide ($TiO_2$), or rhodium oxide ($Rh_2O_3$). The intercalated compounds include $Fe_4[Fe(CN)_6]_3$, $Fe_4[Ru(CN)_6]_3$, $CoFe(CN)_6$, $KVFe(CN)_6$, or $InFe(CN)_6$. The organic compounds include pyrazoline, poly (aniline), or tetrathiafulvalene.

It should be noted that the electro-optical switch 23 according to the first embodiment of the present invention prompts oxidation-reduction reaction to occur by applying voltages to the electrochromic layer 235. The ions required for the oxidation-reduction are provided by the electrolyte layer 234. Specifically, when the electrochromic layer 235 undergoes a reduction reaction, the electrochromic layer 235 begins to change to a color such as blue, green, or yellow. The color of the electrochromic layer 235 is selected according to the aforementioned materials having various colors, thus achieving the purpose of obstructing light. When the electrochromic layer 235 undergoes an oxidation reaction, the electrochromic layer 235 begins to become transparent and colorless, which makes the visible light band penetrate the electrochromic layer 235.

It is noted that the electrochromic layer 235 may be different colors according to requirements, so the electro-optical switch 23 having the electrochromic layer 235 may be applied to a filter. For instance, the electrochromic layer 235 of the electro-optical switch 23 becomes green when a positive voltage is applied, with only the green light band (500 nm-550 nm) being allowed to pass through and preventing the light with other colors from passing through the electro-optical switch 23.

Figure 4A:
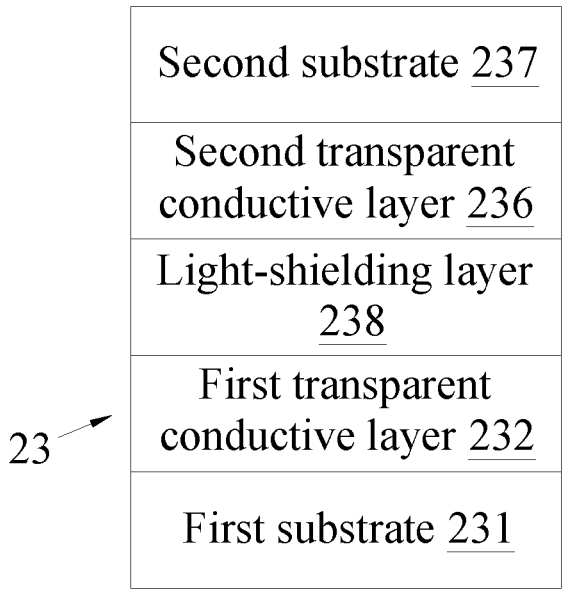
FIG. 4A depicts a structural diagram of the electro-optical switch of the panoramic image system according to the second embodiment of the present invention.
Figure 4A:
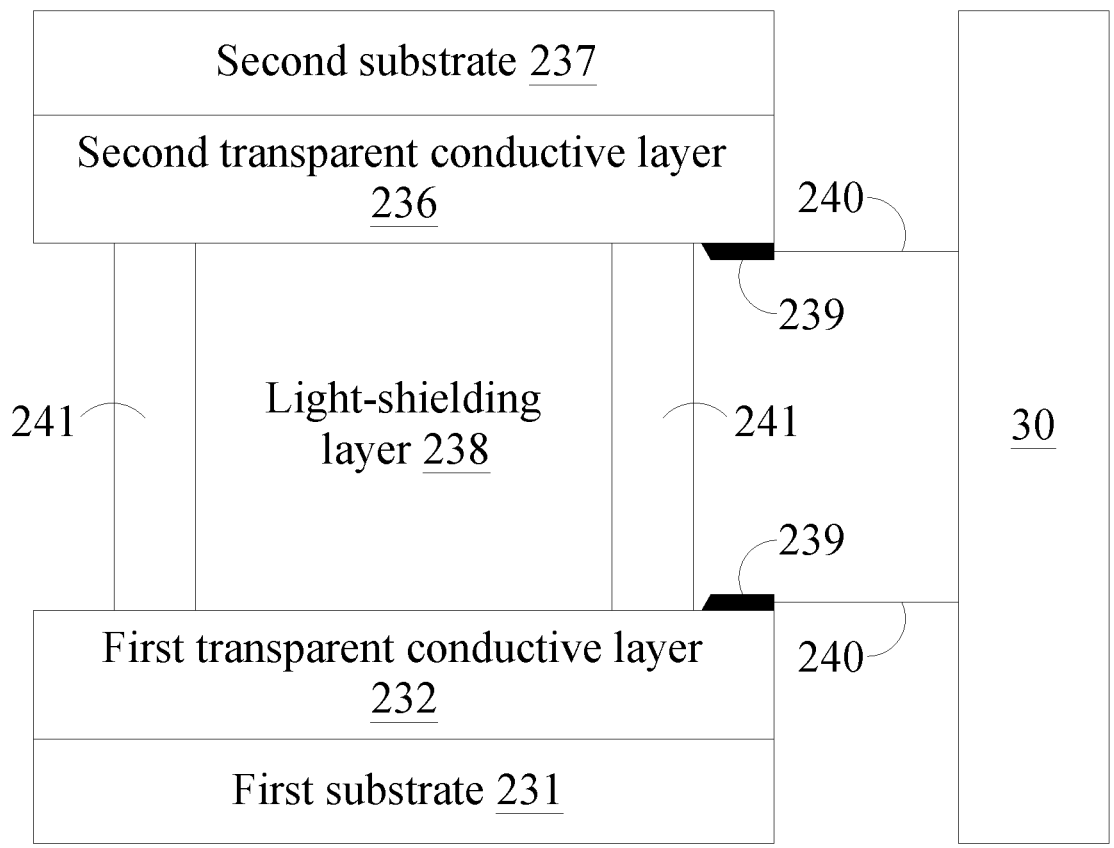

Please refer to FIG. 4A which depicts a structural diagram of the electro-optical switch of the panoramic image system according to the second embodiment of the present invention. FIG. 4A (a) depicts a layer structural diagram of the electro-optical switch of the panoramic image system according to the second embodiment of the present invention. As shown in FIG. 4 (a), each of the single electro-optical switches 23 includes a first substrate 231, a first transparent conductive layer 232, a light-shielding layer 238, a second transparent conductive layer 236, a second substrate 237, and a sealing structure 241. The first transparent conductive layer 232 is disposed on the first substrate 231. The light-shielding layer 238 is disposed on the first transparent conductive layer 232. The second transparent conductive layer 236 is disposed on the light-shielding layer 238. The second substrate 237 is disposed on the second transparent conductive layer 236. The sealing structure 241 is disposed between the first substrate 231 and the second substrate 237 and surrounds the light-shielding layer 238 in an attempt to prevent the solution in the light-shielding layer 238 from flowing out. FIG. 4A (b) depicts a cross-sectional diagram of the electro-optical switch of the panoramic image system according to the second embodiment of the present invention. As shown in FIG. 4 (b), electrodes 239 may be disposed on the electro-optical switch 23. The electrodes 239 may be formed on the first transparent conductive layer 232 and second transparent conductive layer 236 in a form of a contact pad. The image processor 30 may be electrically connected to the electrodes 239 via wires 240 so that voltage may be sent to the electro-optical switch 23. The electrodes 239 may be formed on the first transparent conductive layer 232 and the second transparent conductive layer 236 by using metal materials, conductive adhesive, or other highly conductive materials collocated with the mesh electrode and the optical lithography patterning method. In an embodiment, the electrodes 239 may be formed outside of the sealing structure 241 without overlapping the light-shielding layer 238. In another embodiment, the light-shielding layer 238 overlaps the electrode 239.

Figure 4B:
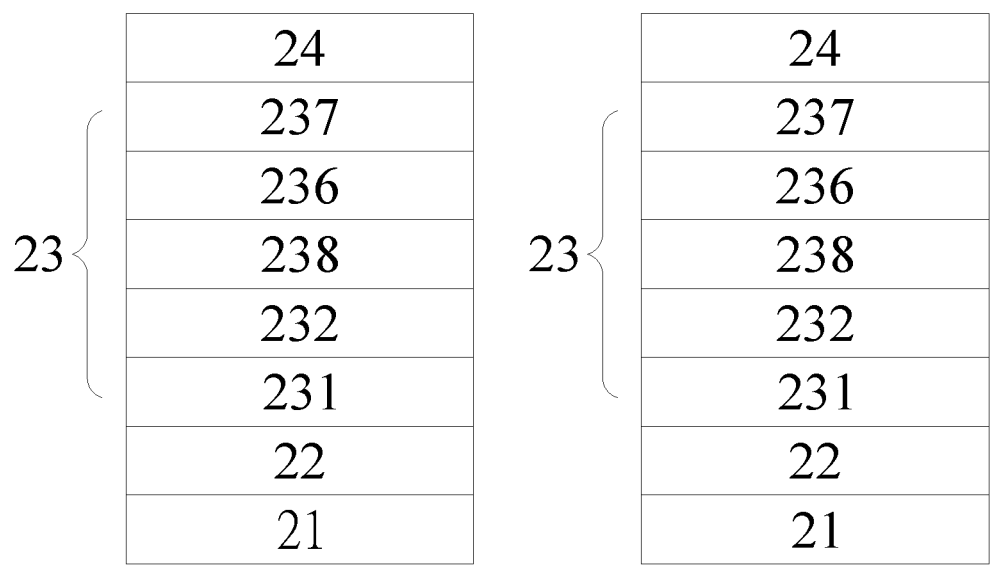
FIG. 4B depicts a structural diagram of the display element of the panoramic image system according to the second embodiment of the present invention.

Please refer to FIG. 4B which depicts a structural diagram of the display element of the panoramic image system according to the second embodiment of the present invention. In an embodiment, as shown in FIG. 4A and FIG. 4B, the first substrate 231 or the second substrate 237 of the electro-optical switch 23 in the display element 20 of the present invention is adjacent to the transparent substrate 24. That is, the stacking order in the electro-optical switch 23 may be adjusted according to actual needs. In another embodiment, the first substrate 231 or the second substrate 237 of the electro-optical switch 23 may be used as the transparent substrate 24 without the need for the transparent substrate 24 originally provided on the display element 20, thereby reducing the thickness of the display element 20.

Wherein, the material of the light-shielding layer 238 includes suspended particles and a polymer dispersed liquid crystal. Since the molecular arrangement direction of such material may be rotated when undertaking voltages, the purpose of obstructing light may be achieved. The auxiliary electrode layer 233 and the electrolyte layer 234 may therefore not be needed. Moreover, since the molecular arrangement direction of the light-shielding layer 238 may be rotated owing to voltages, making the light polarized, a polarizer may be disposed on the display element 20 in such a way that the polarized angle of the light may be more diverse.

Herein, with reference to FIG. 1 to FIG. 4, the operational mechanism of the electro-optical switch 23 is described in detail as follows: (1) When the image brightness of shooting of the camera module 10 is greater than the threshold value, meaning that the light intensity of the ambient light is too high to be suitable for displaying the image to the driver by using the transparent substrate 24, the image processor 30 sends a control signal having a first voltage to each of the electro-optical switches 23. The first voltage is a positive voltage, and each of the electro-optical switches 23 obstructs the travel route of the light, and the display panel 21 displays the panoramic image pieced by the image processor 30. (2) When the image brightness of shooting of the camera module 10 is smaller than the threshold value, meaning that the light intensity of the ambient light is suitable for displaying the image to the driver by using the transparent substrate 24, the image processor 30 sends a control signal having a second voltage to each of the electro-optical switches 23. The second voltage is a negative voltage, and each of the electro-optical switches 23 increases a transmittance thereof to make the light pass through each of the electro-optical switches 23. However, the threshold value may be changed according to the standard of the camera module 10 and the light intensity acceptable to the human eye. Herein, the range of the threshold values may not necessarily be limited. In addition, the image processor 30 adjusts the value of the second voltage according to the image brightness of shooting of each camera module 10 so as to adjust the transmittance of the electro-optical switch 23, making the image viewed by the driver from the transparent substrate 24 much clearer.

In some embodiments, the camera lens L includes three lenses with refractive power, which are a first lens, a second lens, and a third lens sequentially displayed from an object side to an image side, and the camera lens L satisfies the following condition: $0.1 \leq InTL/HOS \leq 0.95$; wherein, HOS is a distance from an object side surface of the first lens to the image side surface on an optical axis; InTL is a distance from an object side surface of the first lens to an image side surface of the third lens on an optical axis.

In some embodiments, the camera lens L includes four lenses with refractive power, which are a first lens, a second lens, a third lens, and a fourth lens sequentially displayed from an object side to an image side, and the camera lens L satisfies the following condition: $0.1 \leq InTL/HOS \leq 0.95$; wherein, HOS is a distance from an object side surface of the first lens to the image side surface on an optical axis; InTL is a distance from an object side surface of the first lens to an image side surface of the fourth lens on an optical axis.

In some embodiments, the camera lens L includes five lenses with refractive power, which are a first lens, a second lens, a third lens, a four lens, and a fifth lens sequentially displayed from an object side to an image side, and the camera lens L satisfies the following condition: $0.1 \leq InTL/HOS \leq 0.95$; wherein, HOS is a distance from an object side surface of the first lens to the image side surface on an optical axis; InTL is a distance from an object side surface of the first lens to an image side surface of the fifth lens on an optical axis.

In addition to the structural embodiment as mentioned above, an optical embodiment related to the camera lens L is to be described as follows. The panoramic image system of the present invention may be designed using three operational wavelengths, namely 486.1 nm, 587.5 nm, and 656.2 nm. Wherein, 587.5 nm is the main reference wavelength for the technical features. The panoramic image system of the present invention may be designed using five operational wavelengths, namely 470 nm, 510 nm, 555 nm, 610 nm, 650 nm. Wherein, 555 nm is the main reference wavelength for the technical features.

PPR is the ratio of the focal length f of the camera lens L to a focal length fp of each of lenses with positive refractive power. NPR is the ratio of the focal length f of the camera lens L to the focal length fn of each of lenses with negative refractive power. The sum of the PPR of all the lenses with positive refractive power is ΣPPR. The sum of the NPR of all the lenses with negative refractive power is ΣNPR. Controlling the total refractive power and total length of the camera lens L may be achieved when the following conditions are satisfied: 0.5≤ΣPPR/|ΣNPR|≤15. Preferably, the following conditions may be satisfied: 1≤ΣPPR/| ΣNPR|3.0.

In addition, HOI is defined as half a diagonal of a sensing field of the optical image sensor S (i.e., the imaging height or the maximum imaging height of the panoramic image system). HOS is a distance on the optical axis from an object side of the first lens to the image plane, which satisfies the following conditions: HOS/HOI≤50; and 0.5≤HOS/f≤150. Preferably, the following conditions are satisfied: 1≤HOS/HOI≤40; 1≤HOS/f≤140. Therefore, the panoramic image system may be maintained in miniaturization so that the module may be equipped on thin and portable electronic products.

In addition, in an embodiment, at least one aperture may be disposed in the camera lens L of the present invention to reduce stray light and enhance image quality.

Specifically, the disposition of the aperture may be a front aperture or a middle aperture in the camera lens L of the present invention. Wherein, the front aperture is the aperture disposed between the shot object and the first lens. The middle aperture is the aperture disposed between the first lens and the image plane. If the aperture is the front aperture, a longer distance may be created between the exit pupil and the image plane in the camera lens L so that more optical elements may be accommodated and the efficiency of the optical image sensor S receiving images may be increased. If the aperture is the middle aperture, the field of view of the system may be expended in such a way that the camera lens L has the advantages of a wide-angle lens. InS is defined as the distance from the aforementioned aperture to the image plane, which satisfies the following condition: 0.1≤InS/HOS≤1.1. Therefore, the features of the camera lens L maintained in miniaturization and having wide-angle may be attended simultaneously.

In the camera lens L of the present invention, InTL is a distance on the optical axis from an object side of the first lens to an image side surface of the sixth lens. ΣTP is the sum of the thicknesses of all the lenses with refractive power on the optical axis. The following conditions are satisfied: 0.1≤ΣTP/InTL≤0.9. Therefore, the contrast ratio of system imaging and the yield rate of lens manufacturing may be attended simultaneously. Moreover, an appropriate back focal length is provided to accommodate other elements.

R1 is the curvature radius of the object side surface of the first lens. R2 is the curvature radius of the image side surface of the first lens. The following condition is satisfied: 0.001≤|R1/R2|≤25. Therefore, the first lens is equipped with appropriate intensity of positive refractive power to prevent the spherical aberration from increasing too fast. Preferably, the following condition is satisfied: 0.01≤|R1/R2|<12.

R11 is the curvature radius of the object side surface of the sixth lens. R12 is the curvature radius of the image side surface of the sixth lens. This following condition is satisfied: −7<(R11−R12)/(R11+R12)<50. Therefore, it is advantageous to correct the astigmatism generated by the camera lens L.

IN12 is the distance between the first lens and the second lens on the optical axis. The following condition is satisfied: IN12/f≤60. Therefore, it is beneficial to improve the chromatic aberration of the lenses so as to enhance the performance.

IN56 is the distance between the fifth lens and the sixth lens on the optical axis. The following condition is satisfied: IN56/f≤3.0. Therefore, it is beneficial to improve the chromatic aberration of the lens so as to enhance the performance.

TP1 and TP2 are respectively the thicknesses of the first lens and the second lens on the optical axis. The following condition is satisfied: 0.1≤(TP1+IN12)/TP2≤10. Therefore, it is beneficial to control the sensitivity produced by the camera lens L so as to enhance the performance.

TP5 and TP6 are respectively the thicknesses of the fifth lens and the sixth lens on the optical axis. The following condition is satisfied: 0.1≤(TP6+IN56)/TP5≤15. Therefore, it is beneficial to control the sensitivity produced by the camera lens L so as to enhance the performance.

TP2, TP3, TP4, and TP5 are respectively the thicknesses of the second lens, the third lens, the fourth lens, and the fifth lens on the optical axis. IN23 is the distance between the second lens and the third lens on the optical axis. IN34 is the distance between the third lens and the fourth lens on the optical axis. IN45 is the distance between the fourth lens and the fifth lens on the optical axis. InTL is the distance from an object side surface of the first lens to an image side surface of the sixth lens. The following condition is satisfied: 0.1≤TP4/(IN34+TP4+IN45)<1. Therefore, it is beneficial to slightly correct the aberration generated by the incident light advancing in the process layer upon layer so as to decrease the overall height of the system.

In the camera lens L, HVT61 is the distance perpendicular to the optical axis between a critical point C61 on an object side surface of the sixth lens and the optical axis. HVT62 is the distance perpendicular to the optical axis between a critical point C62 on an image side surface of the sixth lens and the optical axis. SGC61 is a distance parallel to the optical axis from an axial point on the object side surface of the sixth lens to the critical point C61. SGC62 is the distance parallel to the optical axis from an axial point on the image side surface of the sixth lens to the critical point C62. The following conditions may be satisfied: 0 mm≤HVT61≤3 mm; 0 mm<HVT62≤6 mm; 0≤HVT61/HVT62; 0 mm≤|SGC61|≤0.5 mm; 0 mm<|SGC62|≤2 mm; and 0<|SGC62|/(|SGC62|+TP6)≤0.9. Therefore, it may be effective to correct the aberration of the off-axis view field.

The camera lens L of the present invention satisfies the following condition: 0.2≤HVT62/HOI≤0.9. Preferably, the following condition may be satisfied: 0.3≤HVT62/HOI≤0.8. Therefore, it is beneficial to correct the aberration of the surrounding view field of the camera lens L.

The camera lens L of the present invention satisfies the following condition: 0≤HVT62/HOS≤0.5. Preferably, the following condition may be satisfied: 0.2≤HVT62/HOS≤0.45. Hereby, it is beneficial to correct the aberration of the surrounding view field of the camera lens L.

In the camera lens L of the present invention, SGI611 denotes a distance parallel to an optical axis from an inflection point on the object side surface of the sixth lens which is nearest to the optical axis to an axial point on the object side surface of the sixth lens. SGI621 denotes a distance parallel to an optical axis from an inflection point on the image side surface of the sixth lens which is nearest to the optical axis to an axial point on the image side surface of the sixth lens. The following condition are satisfied: 0<SGI611/(SGI611+TP6)≤0.9; 0<SGI621/(SGI621+TP6)≤0.9. Preferably, the following conditions may be satisfied: 0.1≤SGI611/(SGI611+TP6)≤0.6; 0.1≤SGI621/(SGI621+TP6)≤0.6.

SGI612 denotes a distance parallel to the optical axis from the inflection point on the object side surface of the sixth lens which is the second nearest to the optical axis to an axial point on the object side surface of the sixth lens. SGI622 denotes a distance parallel to an optical axis from an inflection point on the image side surface of the sixth lens which is the second nearest to the optical axis to an axial point on the image side surface of the sixth lens. The following conditions are satisfied: 0<SGI612/(SGI612+TP6)≤0.9; 0<SGI622/(SGI622+TP6)≤0.9. Preferably, the following conditions may be satisfied: 0.1≤SGI612/(SGI612+TP6)≤0.6; 0.1≤SGI622/(SGI622+TP6)≤0.6.

HIF611 denotes the distance perpendicular to the optical axis between the inflection point on the object side surface of the sixth lens which is the nearest to the optical axis and the optical axis. HIF621 denotes the distance perpendicular to the optical axis between an axial point on the image side surface of the sixth lens 16 and an inflection point on the image side surface of the sixth lens which is the nearest to the optical axis. The following conditions are satisfied: 0.001 mm≤|HIF611|≤5 mm; 0.001 mm≤|HIF621|≤5 mm. Preferably, the following conditions may be satisfied: 0.1 mm≤|HIF611|≤3.5 mm; 1.5 mm≤|HIF621|≤3.5 mm.

HIF612 denotes the distance perpendicular to the optical axis between the inflection point on the object side surface of the sixth lens which is the second nearest to the optical axis and the optical axis. HIF622 denotes the distance perpendicular to the optical axis between an axial point on the image side surface of the sixth lens and an inflection point on the image side surface of the sixth lens which is the second nearest to the optical axis. The following conditions are satisfied: 0.001 mm≤|HIF612|≤5 mm; 0.001 mm≤|HIF622|≤5 mm. Preferably, the following conditions may be satisfied: 0.1 mm≤|HIF622|≤3.5 mm; 0.1 mm≤|HIF612|≤3.5 mm.

HIF613 denotes the distance perpendicular to the optical axis between the inflection point on the object side surface of the sixth lens which is the third nearest to the optical axis and the optical axis. HIF623 denotes the distance perpendicular to the optical axis between an axial point on the image side surface of the sixth lens and an inflection point on the image side surface of the sixth lens which is the third nearest to the optical axis. The following conditions are satisfied: 0.001 mm≤|HIF613|≤5 mm; 0.001 mm≤|HIF623|≤5 mm. Preferably, the following conditions may be satisfied: 0.1 mm≤|HIF623|≤3.5 mm; 0.1 mm≤|HIF613|≤3.5 mm.

HIF614 denotes the distance perpendicular to the optical axis between the inflection point on the object side surface of the sixth lens which is the fourth nearest to the optical axis and the optical axis. HIF624 denotes the distance perpendicular to the optical axis between an axial point on the image side surface of the sixth lens and an inflection point on the image side surface of the sixth lens which is the fourth nearest to the optical axis. The following conditions are satisfied: 0.001 mm≤|HIF614|≤5 mm; 0.001 mm≤|HIF624|≤5 mm. Preferably, the following relations may be satisfied: 0.1 mm≤|HIF624|≤3.5 mm and 0.1 mm≤|HIF614|≤3.5 mm.

In the camera lens L of the present invention, (TH1+TH2)/HOI satisfies the following condition: 0<(TH1+TH2)/HOI≤0.95, or 0<(TH1+TH2)/HOI≤0.5 preferably. (TH1+TH2)/HOS satisfies the following condition: 0<(TH1+TH2)/HOS≤0.95, or 0<(TH1+TH2)/HOS≤0.5 preferably. 2*(TH1+TH2)/PhiA satisfies the following condition: 0<2*(TH1+TH2)/PhiA≤0.95, or 0<2*(TH1+TH2)/PhiA≤0.5 preferably.

In an embodiment of the camera lens L in the present invention, interchangeably arranging the lenses with a high dispersion coefficient and a low dispersion coefficient is beneficial to correcting the chromatic aberration of camera lens L.

The equation for the aspheric surface as mentioned above is:

$$z = ch^2/[1+[1(k+1)c^2h^2]^{0.5}] + A4h^4 + A6h^6 + A8h^8 + A10h^{10} + A12h^{12} + A14h^{14} + A16h^{16} + A18h^{18} + A20h^{20} + \ldots \quad (1)$$

Wherein, z is a position value of the position along the optical axis at the height h where the surface apex is regarded as a reference; k is the conic coefficient; c is the reciprocal of curvature radius; and A4, A6, A8, A10, A12, A14, A16, A18, and A20 are high order aspheric coefficients.

In the camera lens L of the present invention, the material of the lens may be made of glass or plastic. Using plastic as the material for producing the lens may effectively reduce the cost of manufacturing. In addition, using glass as the material for producing the lens may control the heat effect and increase the designed space configured by the refractive power of the camera lens L. Moreover, the object side surface and the image side surface from the first lens 11 to the sixth lens 17 may be aspheric, which may obtain more control variables. Apart from eliminating the aberration, the number of lenses used may be reduced compared with that of traditional lenses used made by glass. Thus, the total height of the camera lens L may be reduced effectively.

Furthermore, in the camera lens L of the present invention, when the surface of the lens is a convex surface, the surface of the lens adjacent to the optical axis is convex in principle. When the surface of the lens is a concave surface, the surface of the lens adjacent to the optical axis is concave in principle.

In the camera lens L of the present invention, at least one of the first lens, the second lens, the third lens, the fourth lens, the fifth lens, and sixth lens may further be designed as a light filtration element with a wavelength of less than 500 nm depending on requirements. The light filtration element may be realized by coating at least one surface of the specific lens with the filter function, or may be realized by the lens itself having the material capable of filtering short wavelength.

The image plane of the camera lens L of the present invention may be a plane or a curved surface depending requirements. When the image plane is a curved surface such as a spherical surface with a curvature radius, the incident angle necessary for focusing light on the image plane may be reduced. Hence, it not only contributes to shortening the length (TTL) of the camera lens L, but also promotes the relative illuminance.

The First Optical Embodiment

Figure 5:
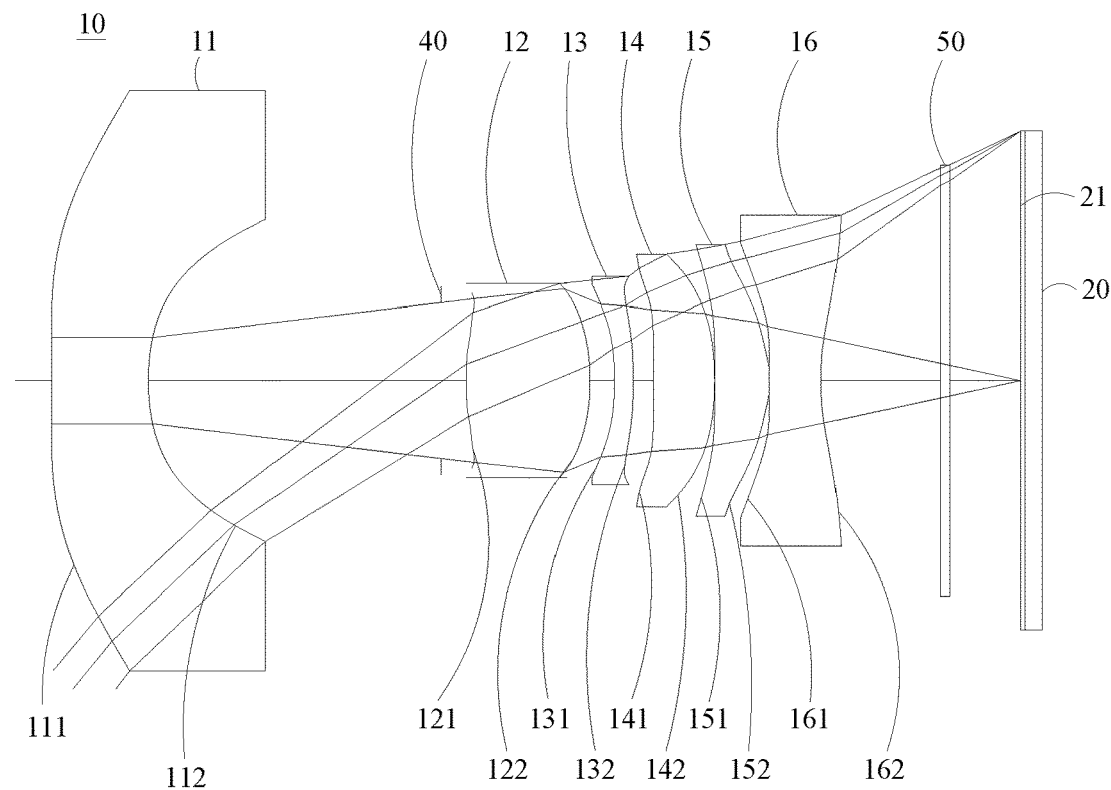
FIG. 5 depicts a configuration diagram of the camera lens of the panoramic image system according to the first embodiment of the present invention.

As shown in FIG. 5, the camera lens L includes six lenses with refractive power, which are a first lens 11, a second lens 21, a third lens 13, a four lens 14, a fifth lens 15, and a sixth lens 16.

Figure 6:
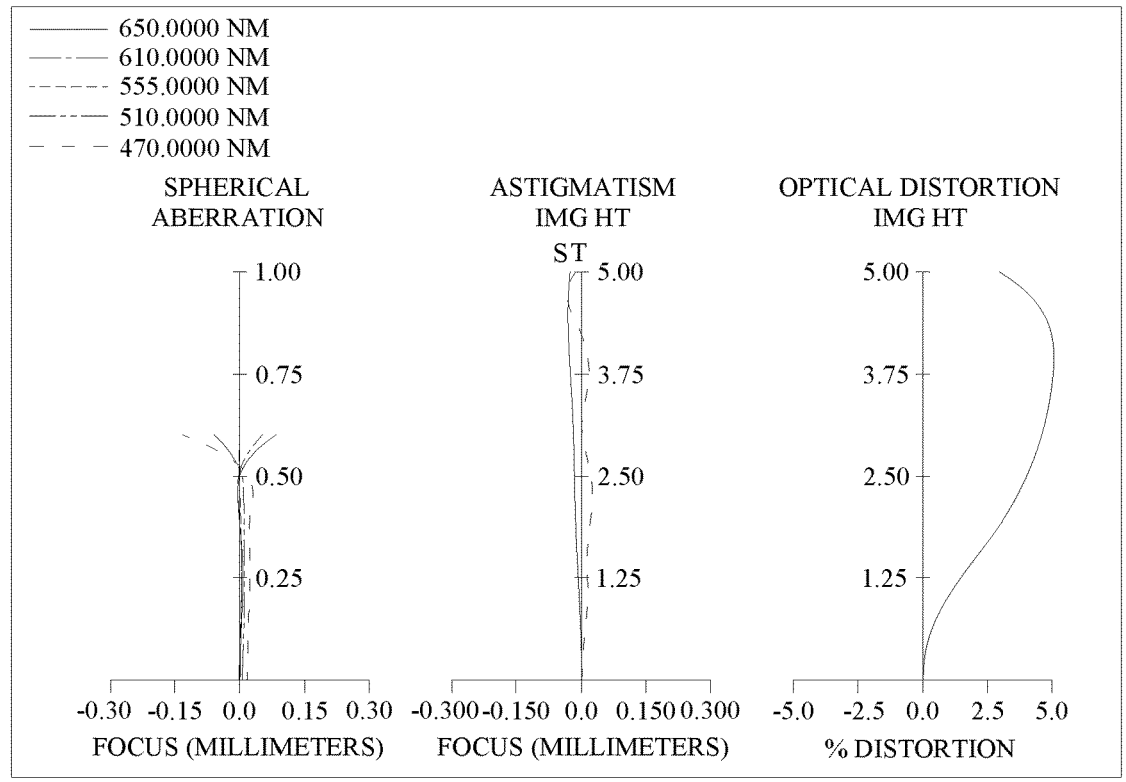
FIG. 6 depicts a curve diagram of the spherical aberration, astigmatism, and optical distortion illustrated sequentially from the left to the right according to the first optical embodiment of the present invention.

Please refer to FIG. 5 and FIG. 6. FIG. 5 depicts a configuration diagram of the camera lens L of the panoramic image system according to the first embodiment of the present invention. FIG. 6 depicts a curve diagram of the spherical aberration, astigmatism, and optical distortion illustrated sequentially from the left to the right according to the first optical embodiment of the present invention. As shown in FIG. 5, the camera module 10 includes a first lens 11, an aperture 40, a second lens 12, a third lens 13, a four lens 14, a fifth lens 15, a sixth lens 16, an IR-cut filter 50, an image plane, and optical image sensor S sequentially displayed from an object side to an image side.

The first lens 11 has negative refractive power and is made of a plastic material. The object side surface 111 thereof is a concave surface and the image side surface 112 thereof is a concave surface, both of which are aspheric. The object side surface 111 thereof has two inflection points. ARS11 denotes the arc length of the maximum effective half diameter of the object side surface 111 of the first lens 11. ARS12 denotes the arc length of the maximum effective half diameter of the image side surface 112 of the first lens 11. ARE11 denotes the arc length of half the entrance pupil diameter (HEP) of the object side surface 111 of the first lens 11. ARE12 denotes the arc length of half the entrance pupil diameter (HEP) of the image side surface 112 of the first lens 11. TP1 is the thickness of the first lens 11 on the optical axis.

SGI111 denotes a distance parallel to the optical axis from the inflection point on the object side surface 111 of the first lens 11 which is the nearest to the optical axis to an axial point on the object side surface 111 of the first lens 11. SGI121 denotes a distance parallel to an optical axis from an inflection point on the image side surface 112 of the first lens 11 which is the nearest to the optical axis to an axial point on the image side surface 112 of the first lens 11. The following conditions are satisfied: SGI111=−0.0031 mm; |SGI111|/(|SGI111|+TP1)=0.0016.

SGI112 denotes the distance parallel to the optical axis from the inflection point on the object side surface 111 of the first lens 11 which is the second nearest to the optical axis to an axial point on the object side surface 111 of the first lens 11. SGI122 denotes the distance parallel to an optical axis from an inflection point on the image side surface 112 of the first lens 11 which is the second nearest to the optical axis to an axial point on the image side surface 112 of the first lens 11. The following conditions are satisfied: SGI112=1.3178 mm; |SGI112|/(|SGI112|+TP1)=0.4052.

HIF111 denotes the distance perpendicular to the optical axis between the inflection point on the object side surface 111 of the first lens 11 which is the nearest to the optical axis and the optical axis. HIF121 denotes the distance perpendicular to the optical axis between an axial point on the image side surface 112 of the first lens 11 and an inflection point on the image side surface 112 of the first lens 11 which is the nearest to the optical axis. The following conditions are satisfied: HIF111=0.5557 mm; HIF111/HOI=0.1111.

HIF112 denotes the distance perpendicular to the optical axis between the inflection point on the object side surface 111 of the first lens 11 which is the second nearest to the optical axis and the optical axis. HIF122 denotes the distance perpendicular to the optical axis between an axial point on the image side surface 112 of the first lens 11 and an inflection point on the image side surface 112 of the first lens 11 which is the second nearest to the optical axis. The following conditions are satisfied: HIF112=5.3732 mm; HIF112/HOI=1.0746.

The second lens 12 has positive refractive power and is made of a plastic material. The object side surface 121 thereof is a convex surface and the image side surface 122 thereof is a convex surface, both of which are aspheric. The object side surface 121 thereof has an inflection point. ARS21 denotes the arc length of the maximum effective half diameter of the object side surface 121 of the second lens 12. ARS22 denotes the arc length of the maximum effective half diameter of the image side surface 122 of the second lens 12. ARE21 denotes an arc length of half the entrance pupil diameter (HEP) of the object side surface 121 of the second lens 12. ARE22 denotes the arc length of half the entrance pupil diameter (HEP) of the image side surface 122 of the second lens 12. TP2 is the thickness of the second lens 12 on the optical axis.

SGI211 denotes the distance parallel to the optical axis from the inflection point on the object side surface 121 of the second lens 12 which is the nearest to the optical axis to an axial point on the object side surface 121 of the second lens 12. SGI221 denotes the distance parallel to an optical axis from an inflection point on the image side surface 122 of the second lens 12 which is the nearest to the optical axis to an axial point on the image side surface 122 of the second lens 12. The following conditions are satisfied: SGI211=0.1069 mm; |SGI211|/(|SGI211|+TP2)=0.0412; SGI221=0 mm; |SGI221|/(|SGI221|+TP2)=0.

HIF211 denotes the distance perpendicular to the optical axis between the inflection point on the object side surface 121 of the second lens 12 which is the nearest to the optical axis and the optical axis. HIF221 denotes the distance perpendicular to the optical axis between an axial point on the image side surface 122 of the second lens 12 and an inflection point on the image side surface 122 of the second lens 12 which is the nearest to the optical axis. The following conditions are satisfied: HIF211=1.1264 mm; HIF211/HOI=0.2253; HIF221=0 mm; HIF221/HOI=0.

The third lens 13 has negative refractive power and is made of a plastic material. The object side surface 131 thereof is a concave surface and the image side surface 132 thereof is a convex surface, both of which are aspheric. The object side surface 131 and the image side surface 132 thereof both have an inflection point. ARS31 denotes the arc length of the maximum effective half diameter of the object side surface 131 of the third lens 13. ARS32 denotes an arc length of the maximum effective half diameter of the image side surface 132 of the third lens 13. ARE31 denotes the arc length of half the entrance pupil diameter (HEP) of the object side surface 131 of the third lens 13. ARE32 denotes the arc length of half the entrance pupil diameter (HEP) of the image side surface 132 of the third lens 13. TP3 is the thickness of the third lens 13 on the optical axis.

SGI311 denotes the distance parallel to the optical axis from the inflection point on the object side surface 131 of the third lens 13 which is the nearest to the optical axis to an axial point on the object side surface 131 of the third lens 13. SGI321 denotes the distance parallel to an optical axis from an inflection point on the image side surface 132 of the third lens 13 which is the nearest to the optical axis to an axial point on the image side surface 132 of the third lens 13. The following conditions are satisfied: SGI311=−0.3041 mm; |SGI311|/(|SGI311|+TP3)=0.4445; SGI321=−0.1172 mm; |SGI321|/(|SGI321|+TP3)=0.2357.

HIF311 denotes the distance perpendicular to the optical axis between the inflection point on the object side surface 131 of the third lens 13 which is the nearest to the optical axis and the optical axis. HIF321 denotes the distance perpendicular to the optical axis between an axial point on the image side surface 132 of the third lens 13 and an inflection point on the image side surface 132 of the third lens 13 which is the nearest to the optical axis. The following conditions are satisfied: HIF311=1.5907 mm; HIF311/HOI=0.3181; HIF321=1.3380 mm; HIF321/HOI=0.2676.

The fourth lens 14 has positive refractive power and is made of a plastic material. The object side surface 141 thereof is a convex surface and the image side surface 142 thereof is a concave surface, both of which are aspheric. The object side surface 141 thereof has two inflection points and the image side surface 142 thereof has an inflection point. ARS41 denotes the arc length of the maximum effective half diameter of the object side surface 141 of the fourth lens 14. ARS42 denotes the arc length of the maximum effective half diameter of the image side surface 142 of the fourth lens 14. ARE41 denotes the arc length of half the entrance pupil diameter (HEP) of the object side surface 141 of the fourth lens 14. ARE42 denotes the arc length of half the entrance pupil diameter (HEP) of the image side surface 142 of the fourth lens 14. TP4 is the thickness of the fourth lens 14 on the optical axis.

SGI411 denotes the distance parallel to the optical axis from the inflection point on the object side surface 141 of the fourth lens 14 which is the nearest to the optical axis to an axial point on the object side surface 141 of the fourth lens 14. SGI421 denotes the distance parallel to an optical axis from an inflection point on the image side surface 142 of the fourth lens 14 which is the nearest to the optical axis to an axial point on the image side surface 142 of the fourth lens 14. The following conditions are satisfied: SGI411=0.0070 mm; |SGI411|/(|SGI411|+TP4)=0.0056; SGI421=0.0006 mm; |SGI421|/(|SGI421|+TP4)=0.0005.

SGI412 denotes the distance parallel to the optical axis from the inflection point on the object side surface 141 of the fourth lens 14 which is the second nearest to the optical axis to an axial point on the object side surface 141 of the fourth lens 14. SGI422 denotes the distance parallel to an optical axis from an inflection point on the image side surface 142 of the fourth lens 14 which is the second nearest to the optical axis to an axial point on the image side surface 142 of the fourth lens 14. The following conditions are satisfied: SGI412=−0.2078 mm; |SGI412|/(|SGI412|+TP4)=0.1439.

HIF411 denotes the distance perpendicular to the optical axis between the inflection point on the object side surface 141 of the fourth lens 14 which is the nearest to the optical axis and the optical axis. HIF421 denotes the distance perpendicular to the optical axis between an axial point on the image side surface 142 of the fourth lens 14 and an inflection point on the image side surface 142 of the fourth lens 14 which is the nearest to the optical axis. The following conditions are satisfied: HIF411=0.4706 mm; HIF411/HOI=0.0941; HIF421=0.1721 mm; HIF421/HOI=0.0344.

HIF412 denotes the distance perpendicular to the optical axis between the inflection point on the object side surface 141 of the fourth lens 14 which is the second nearest to the optical axis and the optical axis. HIF422 denotes the distance perpendicular to the optical axis between an axial point on the image side surface 142 of the fourth lens 14 and an inflection point on the image side surface 142 of the fourth lens 14 which is the second nearest to the optical axis. The following conditions are satisfied: HIF412=2.0421 mm; HIF412/HOI=0.4084.

The fifth lens 15 has positive refractive power and is made of a plastic material. The object side surface 151 thereof is a convex surface and the image side surface 152 thereof is a convex surface, both of which are aspheric. The object side surface 151 thereof has two inflection points and the image side surface 152 thereof has an inflection point. ARS51 denotes the arc length of the maximum effective half diameter of the object side surface 151 of the fifth lens 15. ARS52 denotes the arc length of the maximum effective half diameter of the image side surface 152 of the fifth lens 15. ARE51 denotes the arc length of half the entrance pupil diameter (HEP) of the object side surface 151 of the fifth lens 15. ARE52 denotes the arc length of half the entrance pupil diameter (HEP) of the image side surface 152 of the fifth lens 15. TP5 is the thickness of the fifth lens 15 on the optical axis.

SGI511 denotes the distance parallel to the optical axis from the inflection point on the object side surface 151 of the fifth lens 15 which is the nearest to the optical axis to an axial point on the object side surface 151 of the fifth lens 15. SGI521 denotes the distance parallel to an optical axis from an inflection point on the image side surface 152 of the fifth lens 15 which is the nearest to the optical axis to an axial point on the image side surface 152 of the fifth lens 15. The following conditions are satisfied: SGI511=0.00364 mm; |SGI511|/(|SGI511|+TP5)=0.00338; SGI521=−0.63365 mm; |SGI521|/(|SGI521|+TP5)=0.37154.

SGI512 denotes the distance parallel to the optical axis from the inflection point on the object side surface 151 of the fifth lens 15 which is the second nearest to the optical axis to an axial point on the object side surface 151 of the fifth lens 15. SGI522 denotes the distance parallel to an optical axis from an inflection point on the image side surface 152 of the fifth lens 15 which is the second nearest to the optical axis to an axial point on the image side surface 152 of the fifth lens 15. The following conditions are satisfied: SGI512=−0.32032 mm; |SGI512|/(|SGI512|+TP5)=0.23009.

SGI513 denotes the distance parallel to the optical axis from the inflection point on the object side surface 151 of the fifth lens 15 which is the third nearest to the optical axis to an axial point on the object side surface 151 of the fifth lens 15. SGI523 denotes the distance parallel to an optical axis from an inflection point on the image side surface 152 of the fifth lens 15 which is the third nearest to the optical axis to an axial point on the image side surface 152 of the fifth lens 15. The following conditions are satisfied: SGI513=0 mm; |SGI513|/(|SGI513|+TP5)=0; SGI523=0 mm; |SGI523|/(|SGI523|+TP5)=0.

SGI514 denotes the distance parallel to the optical axis from the inflection point on the object side surface 151 of the fifth lens 15 which is the fourth nearest to the optical axis to an axial point on the object side surface 151 of the fifth lens 15. SGI524 denotes a distance parallel to an optical axis from an inflection point on the image side surface 152 of the fifth lens 15 which is the fourth nearest to the optical axis to an axial point on the image side surface 152 of the fifth lens 15. The following conditions are satisfied: SGI514=0 mm; |SGI514|/(|SGI514|+TP5)=0; SGI524=0 mm; |SGI524|/(|SGI524|+TP5)=0.

HIF511 denotes the distance perpendicular to the optical axis between the inflection point on the object side surface 151 of the fifth lens 15 which is the nearest to the optical axis and the optical axis. HIF521 denotes the distance perpendicular to the optical axis between the optical axis and an inflection point on the image side surface 152 of the fifth lens 15 which is the nearest to the optical axis. The following conditions are satisfied: HIF511=0.28212 mm; HIF511/HOI=0.05642; HIF521=2.13850 mm; HIF521/HOI=0.42770.

HIF512 denotes the distance perpendicular to the optical axis between the inflection point on the object side surface 151 of the fifth lens 15 which is the second nearest to the optical axis and the optical axis. HIF522 denotes the distance perpendicular to the optical axis between the optical axis and an inflection point on the image side surface 152 of the fifth lens 15 which is the second nearest to the optical axis. The following conditions are satisfied: HIF512=2.51384 mm; HIF512/HOI=0.50277.

HIF513 denotes the distance perpendicular to the optical axis between the inflection point on the object side surface 151 of the fifth lens 15 which is the third nearest to the optical axis and the optical axis. HIF523 denotes the distance perpendicular to the optical axis between the optical axis and an inflection point on the image side surface 152 of the fifth lens 15 which is the third nearest to the optical axis. The following conditions are satisfied: HHIF513=0 mm; HIF513/HOI=0; HIF523=0 mm; HIF523/HOI=0.

HIF514 denotes the distance perpendicular to the optical axis between the inflection point on the object side surface 151 of the fifth lens 15 which is the fourth nearest to the optical axis and the optical axis. HIF524 denotes the distance perpendicular to the optical axis between the optical axis and an inflection point on the image side surface 152 of the fifth lens 15 which is the fourth nearest to the optical axis. The following conditions are satisfied: HIF514=0 mm; HIF514/HOI=0; HIF524=0 mm; HIF524/HOI=0.

The sixth lens 16 has negative refractive power and is made of a plastic material. The object side surface 161 thereof is a concave surface and the image side surface 162 thereof is a concave surface. The object side surface 161 has two inflection points and the image side surface 162 thereof has an inflection point. Therefore, it may be effective to adjust the angle at which each field of view is incident on the sixth lens 16 to improve the aberration. ARS61 denotes the arc length of the maximum effective half diameter of the object side surface 161 of the sixth lens 16. ARS62 denotes the arc length of the maximum effective half diameter of the image side surface 162 of the sixth lens 16. ARE61 denotes the arc length of half the entrance pupil diameter (HEP) of the object side surface 161 of the sixth lens 16. ARE62 denotes the arc length of half the entrance pupil diameter (HEP) of the image side surface 162 of the sixth lens 16. TP6 is the thickness of the sixth lens 16 on the optical axis.

SGI611 denotes the distance parallel to the optical axis from the inflection point on the object side surface 161 of the sixth lens 16 which is the nearest to the optical axis to an axial point on the object side surface 161 of the sixth lens 16. SGI621 denotes the distance parallel to an optical axis from an inflection point on the image side surface 162 of the sixth lens 16 which is the nearest to the optical axis to an axial point on the image side surface 162 of the sixth lens 16. The following conditions are satisfied: SGI611=−0.38558 mm; |SGI611|/(|SGI611|+TP6)=0.27212; SGI621=0.12386 mm; |SGI621|/(|SGI621|+TP6)=0.10722.

SGI612 denotes the distance parallel to the optical axis from the inflection point on the object side surface 161 of the sixth lens 16 which is the second nearest to the optical axis to an axial point on the object side surface 161 of the sixth lens 16. SGI621 denotes the distance parallel to an optical axis from an inflection point on the image side surface 162 of the sixth lens 16 which is the second nearest to the optical axis to an axial point on the image side surface 162 of the sixth lens 16. The following conditions are satisfied: SGI612=−0.47400 mm; |SGI612|/(|SGI612|+TP6)=0.31488; SGI622=0 mm; |SGI622|/(|SGI622|+TP6)=0.

HIF611 denotes the distance perpendicular to the optical axis between the inflection point on the object side surface 161 of the sixth lens 16 which is the nearest to the optical axis and the optical axis. HIF621 denotes the distance perpendicular to the optical axis between the inflection point on the image side surface 162 of the sixth lens 16 which is the nearest to the optical axis and the optical axis. The following conditions are satisfied: HIF611=2.24283 mm; IF611/HOI=0.44857; HIF621=1.07376 mm; HIF621/HOI=0.21475.

HIF612 denotes the distance perpendicular to the optical axis between the inflection point on the object side surface 161 of the sixth lens 16 which is the second nearest to the optical axis and the optical axis. HIF622 denotes the distance perpendicular to the optical axis between the inflection point on the image side surface 162 of the sixth lens 16 which is the second nearest to the optical axis and the optical axis. The following conditions are satisfied: HIF611=2.24283 mm; HIF612=2.48895 mm; HIF612/HOI=0.49779.

HIF613 denotes the distance perpendicular to the optical axis between the inflection point on the object side surface 161 of the sixth lens 16 which is the third nearest to the optical axis and the optical axis. HIF623 denotes the distance perpendicular to the optical axis between the inflection point on the image side surface 162 of the sixth lens 16 which is the third nearest to the optical axis and the optical axis. The following conditions are satisfied: HIF613=0 mm; HIF613/HOI=0; HIF623=0 mm; HIF623/HOI=0.

HIF614 denotes the distance perpendicular to the optical axis between the inflection point on the object side surface 161 of the sixth lens 16 which is the fourth nearest to the optical axis and the optical axis. HIF624 denotes the distance perpendicular to the optical axis between the inflection point on the image side surface 162 of the sixth lens 16 which is the fourth nearest to the optical axis and the optical axis. The following conditions are satisfied: HIF614=0 mm; HIF614/HOI=0; HIF624=0 mm; HIF624/HOI=0.

The IR-cut filter 50 is made of glass and is disposed between the sixth lens 16 and the optical image sensor S, which does not affect the focal length of the camera lens L.

In the camera lens L of the embodiment, f is the focal length of the camera lens L. HEP is the entrance pupil diameter of the camera lens L. HAF is half of the maximum view angle of the camera lens L. The detailed parameters are shown as below: f=4.075 mm, f/HEP=1.4, HAF=50.001°, and tan(HAF)=1.1918.

In the camera lens L of the embodiment, f1 is the focal length of the first lens 11. f6 is a focal length of the sixth lens 16. The following conditions are satisfied: f1=−7.828 mm; |f/f1|=0.52060; f6=−4.886; and |f1|>|f6|.

In the camera lens L of the embodiment, the focal lengths of the second lens 12 to the fifth lens 15 are f2, f3, f4, and f5, respectively. The following conditions are satisfied: |f2|+|f3|+|f4|+|f5|=95.50815 mm; |f1|+|f6|=12.71352 mm and |f2|+|f3|+|f4|+|f5|>|f1|+|f6|.

PPR is the ratio of the focal length f of the camera lens L to a focal length fp of each of lenses with positive refractive power. NPR is the ratio of the focal length f of the camera lens L to a focal length fn of each of lenses with negative refractive power. In the camera lens L of the embodiment, The sum of the PPR of all lenses with positive refractive power is ΣPPR=f/f2+f/f4+f/f5=1.63290. The sum of the NPR of all lenses with negative refractive power is ΣNPR=|f/f1|+|f/f3|+|f/f6|=1.51305, and ΣPPR/|ΣNPR|=1.07921. The following conditions are also satisfied: |f/f2|=0.69101; |f/f3|=0.15834; |f/f4|=0.06883; |f/f5|=0.87305; |f/f6|=0.83412.

In the panoramic image system of the embodiment, InTL is the distance on the optical axis from an object side surface 111 of the first lens 11 to an image side surface 162 of the sixth lens 16. HOS is the distance on the optical axis from an object side surface 111 of the first lens 11 to the image plane. InS is a distance from the aperture 40 to the image plane. HOI is defined as half the diagonal of the sensing field of the optical image sensor S. BFL is the distance from the image side surface 162 of the sixth lens 16 and the image plane. The following conditions are satisfied: InTL+BFL=HOS; HOS=19.54120 mm; HOI=5.0 mm; HOS/HOI=3.90824; HOS/f=4.7952; InS=11.685 mm; and InS/HOS=0.59794.

In the camera lens L of the embodiment, ΣTP is the sum of the thicknesses of all the lenses with refractive power on the optical axis. The following condition is satisfied: ΣTP=8.13899 mm, ΣTP/InTL=0.52477, and InTL/HOS=0.917102. Therefore, the contrast ratio of system imaging and the yield rate of lens manufacturing may be attended simultaneously. Moreover, an appropriate back focal length is provided to accommodate other elements.

In the camera lens L of the embodiment, R1 is the curvature radius of the object side surface 111 of the first lens 11. R2 is the curvature radius of the image side surface 112 of the first lens 11. The following condition is satisfied: |R1/R2|=8.99987. Therefore, the first lens 11 is equipped with appropriate intensity of positive refractive power to prevent the spherical aberration from increasing too fast.

In the camera lens L of the embodiment, R11 is the curvature radius of the object side surface 161 of the sixth lens 16. R12 is the curvature radius of the image side surface 162 of the sixth lens 16. This following condition is satisfied: (R11−R12)/(R11+R12)=1.27780. Therefore, it is advantageous to correct the astigmatism generated by the camera lens L.

In the camera lens L of the embodiment, ΣPP is the sum of the focal lengths of all lenses with positive refractive power. The following conditions are satisfied: ΣPP=f2+f4+f5=69.770 mm and f5/(f2+f4+f5)=0.067. Therefore, it is beneficial to properly distribute the positive refractive power of a single lens to other positive lenses to suppress the generation of significant aberrations during the traveling of incident light.

In the camera lens L of the embodiment, ΣNP is the sum of the focal lengths of all lenses with negative refractive power. The following conditions are satisfied: ΣNP=f1+f3+f6=−38.451 mm and f6/(f1+f3+f6)=0.127. Therefore, it is beneficial to properly distribute the negative refractive power of the sixth lens 16 to other negative lenses to suppress the generation of significant aberrations during the traveling of incident light.

In the camera lens L of the embodiment, IN12 is the distance between the first lens 11 and the second lens 12 on the optical axis. The following condition is satisfied: IN12=6.418 mm; IN12/f=1.57491. Therefore, it is beneficial to improve the chromatic aberration of the lenses so as to enhance the performance.

In the camera lens L of the embodiment, IN56 is a distance between the fifth lens 15 and the sixth lens 16 on the optical axis. The following condition is satisfied: IN56=0.025 mm; IN56/f=0.00613. Therefore, it is beneficial to improve the chromatic aberration of the lenses so as to enhance the performance.

In the camera lens L of the embodiment, TP1 and TP2 are respectively the thicknesses of the first lens 11 and the second lens 12 on the optical axis. The following condition is satisfied: TP1=1.934 mm; TP2=2.486 mm; and (TP1+IN12)/TP2=3.36005. Therefore, it is beneficial to control the sensitivity produced by the camera lens L so as to enhance the performance.

In the camera lens L of the embodiment, TP5 and TP6 are respectively the thicknesses of the fifth lens 15 and the sixth lens 16 on the optical axis. IN56 is a distance between the two lenses on the optical axis. The following conditions are satisfied: TP5=1.072 mm; TP6=1.031 mm; (TP6+IN56)/TP5=0.98555. Therefore, it is beneficial to control the sensitivity produced by the camera lens L so as to enhance the performance.

In the camera lens L of the embodiment, IN34 is a distance between the third lens 13 and the fourth lens 14 on the optical axis. IN45 is a distance between the fourth lens 14 and the fifth lens 15 on the optical axis. The following conditions are satisfied: IN34=0.401 mm; IN45=0.025 mm; and TP4/(IN34+TP4+IN45)=0.74376. Therefore, it is beneficial to slightly correct the aberration generated by the incident light advancing in the process layer upon layer so as to decrease the overall height of the system.

In the camera lens L of the embodiment, InRS51 is the horizontal distance parallel to an optical axis from a maximum effective half diameter position to an axial point on the object side surface 151 of the fifth lens 15. InRS52 is the horizontal distance parallel to an optical axis from a maximum effective half diameter position to an axial point on the image side surface 152 of the fifth lens 15. TP5 is the thickness of the fifth lens 15 on the optical axis. The following condition is satisfied: |InRS51|=−0.34789 mm; InRS52=−0.88185 mm; |InRS51|/TP5=0.32458 and |InRS52|TP5=0.82276. Therefore, it is advantageous for the lens to be manufactured and formed so as to maintain minimization.

In the camera lens L of the embodiment, HVT51 is the distance perpendicular to the optical axis between a critical point on an object side surface 151 of the fifth lens 15 and the optical axis. HVT52 is the distance perpendicular to the optical axis between a critical point on an image side surface 152 of the fifth lens 15 and the optical axis. The following conditions are satisfied: HVT51=0.515349 mm; HVT52=0 mm.

In the camera lens L of the embodiment, InRS61 is the horizontal distance parallel to an optical axis from a maximum effective half diameter position to an axial point on the object side surface 161 of the sixth lens 16. InRS62 is the horizontal distance parallel to an optical axis from a maximum effective half diameter position to an axial point on the image side surface 162 of the sixth lens 16. TP6 is the thickness of the sixth lens 16 on the optical axis. The following conditions are satisfied: InRS61=−0.58390 mm; InRS62=0.41976 mm; |InRS61|/TP6=0.56616 and |InRS62|/TP6=0.40700. Therefore, it is advantageous for the lens to be manufactured and formed so as to maintain minimization.

In the camera lens L of the embodiment, HVT61 is the distance perpendicular to the optical axis between a critical point on an object side surface 161 of the sixth lens 16 and the optical axis. HVT62 is the distance perpendicular to the optical axis between a critical point on an image side surface 162 of the sixth lens 16 and the optical axis. The following conditions are satisfied: HVT61=0 mm; HVT62=0 mm.

In the camera lens L of the embodiment, the following conditions are satisfied: HVT51/HOI=0.1031. Therefore, it is beneficial to correct the aberration of the surrounding view field of the panoramic image system.

In the camera lens L of the embodiment, the following conditions are satisfied: HVT51/HOS=0.02634. Therefore, it is beneficial to correct the aberration of the surrounding view field of the panoramic image system.

In the camera lens L of the embodiment, the second lens 12, the third lens 13, and the sixth lens 16 have negative refractive power. A dispersion coefficient of the second lens 12 is NA2. A dispersion coefficient of the third lens 13 is NA3. A dispersion coefficient of the sixth lens 16 is NA6. The following condition is satisfied: NA6/NA2≤1. Therefore, it is beneficial to correct the aberration of the camera lens L.

In the panoramic image system of the embodiment, TDT refers to TV distortion when an image is formed. ODT refers to optical distortion when an image is formed. The following conditions are satisfied: TDT=2.124%; ODT=5.076%.

In the camera lens L of the embodiment, LS is 12 mm. PhiA is 2*EHD62=6.726 mm (EHD62: the maximum effective half diameter of the image side 162 of the sixth lens 16). PhiC=PhiA+2*TH2=7.026 mm; PhiD=PhiC+2*(TH1+TH2)=7.426 mm; TH1 is 0.2 mm; TH2 is 0.15 mm; PhiA/PhiD is 0.9057; TH1+TH2 is 0.35 mm; (TH1+TH2)/HOI is 0.035; (TH1+TH2)/HOS is 0.0179; 2*(TH1+TH2)/PhiA is 0.1041; (TH1+TH2)/LS is 0.0292.

Please refer to Table 1 and Table 2 in the following.

TABLE 1

Data of the first optical embodiment
f = 4.075 mm; f/HEP = 1.4; HAF = 50.000 deg

| Surface | | Curvature Radius | Thickness (mm) | Material |
|---|---|---|---|---|
| 0 | Object | Plano | Plano | |
| 1 | Lens 1 | −40.99625704 | 1.934 | Plastic |
| 2 | | 4.555209289 | 5.923 | |
| 3 | Aperture | Plano | 0.495 | |
| 4 | Lens 2 | 5.333427366 | 2.486 | Plastic |
| 5 | | −6.781659971 | 0.502 | |
| 6 | Lens 3 | −5.697794287 | 0.380 | Plastic |
| 7 | | −8.883957518 | 0.401 | |
| 8 | Lens 4 | 13.19225664 | 1.236 | Plastic |
| 9 | | 21.55681832 | 0.025 | |
| 10 | Lens 5 | 8.987806345 | 1.072 | Plastic |
| 11 | | −3.158875374 | 0.025 | |
| 12 | Lens 6 | −29.46491425 | 1.031 | Plastic |
| 13 | | 3.593484273 | 2.412 | |
| 14 | IR-cut filter | Plano | 0.200 | |
| 15 | | Plano | 1.420 | |
| 16 | Image plane | Plano | | |

| Surface | Refractive index | Dispersion coefficient | Focal length |
|---|---|---|---|
| 0 | | | |
| 1 | 1.515 | 56.55 | −7.828 |
| 2 | | | |
| 3 | | | |
| 4 | 1.544 | 55.96 | 5.897 |
| 5 | | | |
| 6 | 1.642 | 22.46 | −25.738 |
| 7 | | | |
| 8 | 1.544 | 55.96 | 59.205 |
| 9 | | | |
| 10 | 1.515 | 56.55 | 4.668 |
| 11 | | | |
| 12 | 1.642 | 22.46 | −4.886 |
| 13 | | | |
| 14 | 1.517 | 64.13 | |
| 15 | | | |
| 16 | | | |

Reference wavelength = 555 nm;
Shield position: The clear aperture of the first surface is 5.800 mm.
The clear aperture of the third surface is 1.570 mm.
The clear aperture of the fifth surface is 1.950 mm.

Table 2. The Aspheric Surface Parameters of the First Optical Embodiment

TABLE 2

Aspheric Coefficients

| | Surface | | | |
|---|---|---|---|---|
| | 1 | 2 | 4 | 5 |
| k | 4.310876E+01 | −4.707622E+00 | 2.616025E+00 | 2.445397E+00 |
| A4 | 7.054243E−03 | 1.714312E−02 | −8.377541E−03 | −1.789549E−02 |
| A6 | −5.233264E−04 | −1.502232E−04 | −1.838068E−03 | −3.657520E−03 |
| A8 | 3.077890E−05 | −1.359611E−04 | 1.233332E−03 | −1.131622E−03 |
| A10 | −1.260650E−06 | 2.680747E−05 | −2.390895E−03 | 1.390351E−03 |
| A12 | 3.319093E−08 | −2.017491E−06 | 1.998555E−03 | −4.152857E−04 |
| A14 | −5.051600E−10 | 6.604615E−08 | −9.734019E−04 | 5.487286E−05 |
| A16 | 3.380000E−12 | −1.301630E−09 | 2.478373E−04 | −2.919339E−06 |

| | Surface | | | |
|---|---|---|---|---|
| | 6 | 7 | 8 | 9 |
| k | 5.645686E+00 | −2.117147E+01 | −5.287220E+00 | 6.200000E+01 |
| A4 | −3.379055E−03 | −1.370959E−02 | −2.937377E−02 | −1.359965E−01 |
| A6 | −1.225453E−03 | 6.250200E−03 | 2.743532E−03 | 6.628518E−02 |
| A8 | −5.979572E−03 | −5.854426E−03 | −2.457574E−03 | −2.129167E−02 |
| A10 | 4.556449E−03 | 4.049451E−03 | 1.874319E−03 | 4.396344E−03 |
| A12 | −1.177175E−03 | −1.314592E−03 | −6.013661E−04 | −5.542899E−04 |
| A14 | 1.370522E−04 | 2.143097E−04 | 8.792480E−05 | 3.768879E−05 |
| A16 | −5.974015E−06 | −1.399894E−05 | −4.770527E−06 | −1.052467E−06 |

| | Surface | | | |
|---|---|---|---|---|
| | 10 | 11 | 12 | 13 |
| k | −2.114008E+01 | −7.699904E+00 | −6.155476E+01 | −3.120467E−01 |
| A4 | −1.263831E−01 | −1.927804E−02 | −2.492467E−02 | −3.521844E−02 |

TABLE 2-continued

| Aspheric Coefficients | | | | |
|---|---|---|---|---|
| A6 | 6.965399E−02 | 2.478376E−03 | −1.835360E−03 | 5.629654E−03 |
| A8 | −2.116027E−02 | 1.438785E−03 | 3.201343E−03 | −5.466925E−04 |
| A10 | 3.819371E−03 | −7.013749E−04 | −8.990757E−04 | 2.231154E−05 |
| A12 | −4.040283E−04 | 1.253214E−04 | 1.245343E−04 | 5.548990E−07 |
| A14 | 2.280473E−05 | −9.943196E−06 | −8.788363E−06 | −9.396920E−08 |
| A16 | −5.165452E−07 | 2.898397E−07 | 2.494302E−07 | 2.728360E−09 |

The values related to arc lengths may be obtained according to Table 1 and Table 2.

| First optical embodiment (Reference wavelength = 555 nm) | | | | | |
|---|---|---|---|---|---|
| ARE | 1/2(HEP) | ARE value | ARE − 1/2(HEP) | 2(ARE/ HEP) % | TP | ARE/ TP (%) |
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |

| ARS | EHD | ARS value | ARS − EHD | (ARS/ EHD) % | TP | ARS/ TP (%) |
|---|---|---|---|---|---|---|
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Table 1 is the detailed structure data to the first optical embodiment, wherein the unit of the curvature radius, the thickness, the distance, and the focal length is millimeters (mm). Surfaces 0-16 illustrate the surfaces from the object side to the image side. Table 2 is the aspheric coefficients of the first optical embodiment, wherein k is the conic coefficient in the aspheric surface formula. A1-A20 are aspheric surface coefficients from the first to the twentieth orders for each surface. In addition, the tables for each of the embodiments as follows correspond to the schematic views and the aberration graphs for each of the embodiments. The definitions of data in the tables are the same as those in Table 1 and Table 2 for the first optical embodiment. Therefore, similar description shall not be illustrated again. Furthermore, the definitions of element parameters in each of the embodiments are the same as those in the first optical embodiment.

The Second Optical Embodiment

Figure 7:
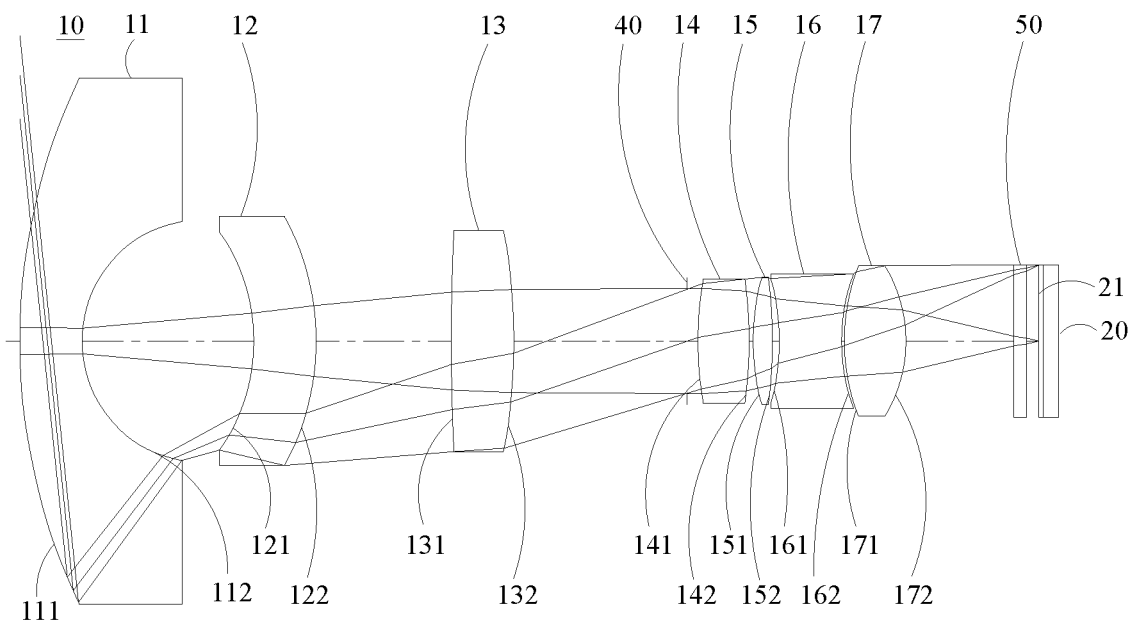
FIG. 7 depicts a configuration diagram of the camera lens of the panoramic image system according to the second embodiment of the present invention.

As shown in FIG. 7, the camera lens L may include seven lenses with refractive power, which are a first lens 11, a second lens 12, a third lens 13, a four lens 14, a fifth lens 15, a sixth lens 16, and a seventh lens 17 sequentially displayed from an object side surface to an image side surface.

Figure 8:
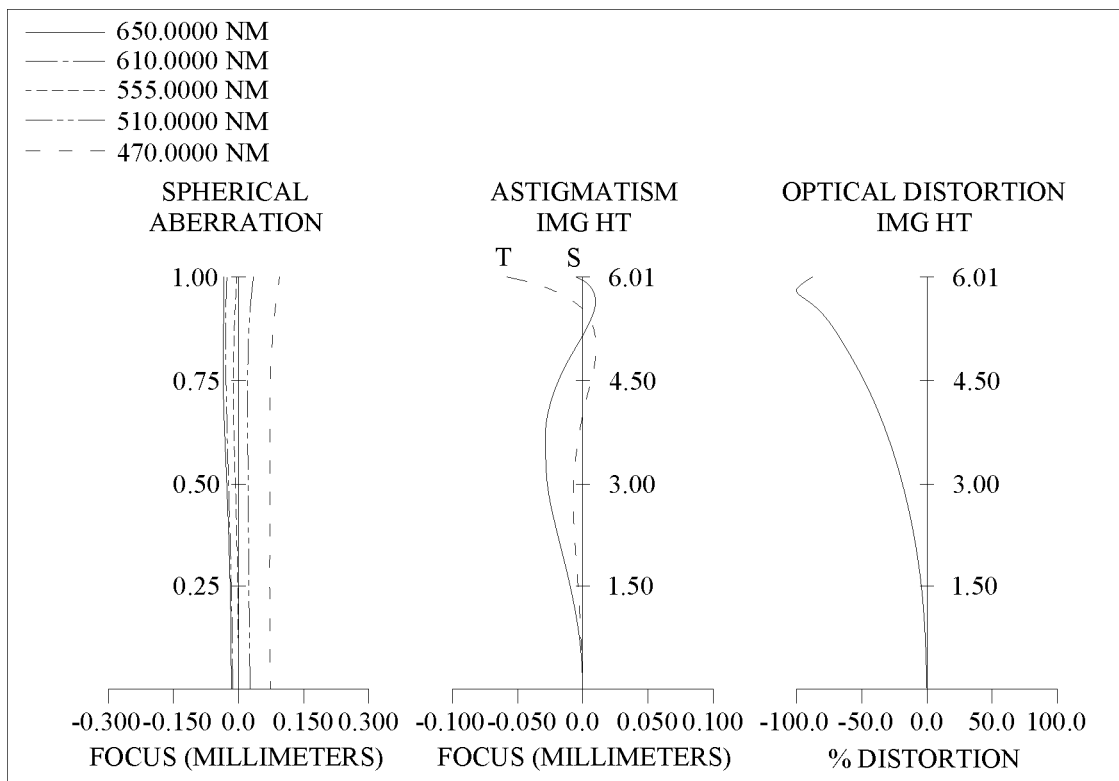
FIG. 8 depicts a curve diagram of the spherical aberration, astigmatism, and optical distortion illustrated sequentially from the left to the right according to the second optical embodiment of the present invention.

Please refer to FIG. 7 and FIG. 8. FIG. 7 depicts a configuration diagram of the camera lens L of the panoramic image system according to the second optical embodiment of the present invention. FIG. 8 depicts a curve diagram of the spherical aberration, astigmatism, and optical distortion illustrated sequentially from the left to the right according to the second optical embodiment of the present invention. As shown in FIG. 7, the camera module 10 includes a first lens 11, a second lens 12, a third lens 13, an aperture 40, a four lens 14, a fifth lens 15, a sixth lens 16, a seventh lens 17, an IR-cut filter 50, an image plane, and optical image sensor S sequentially displayed from an object side to an image side.

The first lens 11 has negative refractive power and is made of a glass material. The object side surface 111 thereof is a convex surface and the image side surface 112 thereof is a concave surface.

The second lens 12 has negative refractive power and is made of a glass material. The object side surface thereof 121 is a concave surface and the image side surface thereof 122 is a convex surface.

The third lens 13 has positive refractive power and is made of a glass material. The object side surface 131 thereof is a convex surface and the image side surface 132 thereof is a convex surface.

The fourth lens 14 has positive refractive power and is made of a glass material. The object side surface 141 thereof is a convex surface and the image side surface 142 thereof is a convex surface.

The fifth lens 15 has positive refractive power and is made of a glass material. The object side surface 151 thereof is a convex surface and the image side surface 152 thereof is a convex surface.

The sixth lens 16 has negative refractive power and is made of a glass material. The object side surface 161 thereof is a concave surface and the image side surface 162 thereof is a concave surface. Therefore, it may be effective to adjust the angle at which each field of view is incident on the sixth lens 16 to improve the aberration.

The seventh lens 17 has negative refractive power and is made of a glass material. The object side surface 171 thereof is a convex surface and the image side surface 172 thereof is a convex surface. Therefore, it is advantageous for the lens to reduce the back focal length to maintain minimization. In addition, it is effective to suppress the incident angle with incoming light from an off-axis view field and further correct the aberration in the off-axis view field.

The IR-cut filter 50 is made of glass and is disposed between the seventh lens 17 and the optical image sensor S, which does not affect the focal length of the camera lens L.

Please refer to the following Table 3 and Table 4.

TABLE 3

| Data of the second optical embodiment f = 4.7601 mm; f/HEP = 2.2; HAF = 95.98 deg | | | |
|---|---|---|---|
| Surface | | Curvature Radius | Thickness (mm) | Material |
| 0 | Object | 1E+18 | 1E+18 | |
| 1 | Lens 1 | 47.71478323 | 4.977 | Glass |
| 2 | | 9.527614761 | 13.737 | |
| 3 | Lens 2 | −14.88061107 | 5.000 | Glass |

TABLE 3-continued

Data of the second optical embodiment
f = 4.7601 mm; f/HEP = 2.2; HAF = 95.98 deg

| | | | | |
|---|---|---|---|---|
| 4 | | −20.42046946 | 10.837 | |
| 5 | Lens 3 | 182.4762997 | 5.000 | Glass |
| 6 | | −46.71963608 | 13.902 | |
| 7 | Aperture | 1E+18 | 0.850 | |
| 8 | Lens 4 | 28.60018103 | 4.095 | Glass |
| 9 | | −35.08507586 | 0.323 | |
| 10 | Lens 5 | 18.25991342 | 1.539 | Glass |
| 11 | | −36.99028878 | 0.546 | |
| 12 | Lens 6 | −18.24574524 | 5.000 | Glass |
| 13 | | 15.33897192 | 0.215 | |
| 14 | Lens 7 | 16.13218937 | 4.933 | Glass |
| 15 | | −11.24007 | 8.664 | |
| 16 | IR-cut filter | 1E+18 | 1.000 | BK_7 |
| 17 | | 1E+18 | 1.007 | |
| 18 | Image plane | 1E+18 | −0.007 | |

Reference wavelength (d-line) = 555 nm

| Surface | Refractive index | Dispersion coefficient | Focal length |
|---|---|---|---|
| 0 | | | |
| 1 | 2.001 | 29.13 | −12.647 |
| 2 | | | |
| 3 | 2.001 | 29.13 | −99.541 |
| 4 | | | |
| 5 | 1.847 | 23.78 | 44.046 |
| 6 | | | |
| 7 | | | |
| 8 | 1.834 | 37.35 | 19.369 |
| 9 | | | |
| 10 | 1.609 | 46.44 | 20.223 |
| 11 | | | |
| 12 | 2.002 | 19.32 | −7.668 |
| 13 | | | |
| 14 | 1.517 | 64.20 | 13.620 |
| 15 | | | |
| 16 | 1.517 | 64.2 | |
| 17 | | | |
| 18 | | | |

Reference Wavelength = 555 nm

TABLE 4

The aspheric surface parameters of the second optical embodiment
Table 4. Aspheric Coefficients

| | Surface | | | |
|---|---|---|---|---|
| | 1 | 2 | 3 | 4 |
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10 | 0.000000E+00 | 0.000000E+00 | 0.000000E+00 | 0.000000E+00 |
| A12 | 0.000000E+00 | 0.000000E+00 | 0.000000E+00 | 0.000000E+00 |

| | Surface | | | |
|---|---|---|---|---|
| | 5 | 6 | 8 | 9 |
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10 | 0.000000E+00 | 0.000000E+00 | 0.000000E+00 | 0.000000E+00 |
| A12 | 0.000000E+00 | 0.000000E+00 | 0.000000E+00 | 0.000000E+00 |

| | Surface | | | |
|---|---|---|---|---|
| | 10 | 11 | 12 | 13 |
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10 | 0.000000E+00 | 0.000000E+00 | 0.000000E+00 | 0.000000E+00 |
| A12 | 0.000000E+00 | 0.000000E+00 | 0.000000E+00 | 0.000000E+00 |

| | Surface | |
|---|---|---|
| | 14 | 15 |
| k | 0.000000E+00 | 0.000000E+00 |
| A4 | 0.000000E+00 | 0.000000E+00 |
| A6 | 0.000000E+00 | 0.000000E+00 |
| A8 | 0.000000E+00 | 0.000000E+00 |
| A10 | 0.000000E+00 | 0.000000E+00 |
| A12 | 0.000000E+00 | 0.000000E+00 |

In the second optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 3 and Table 4.

The second optical embodiment (Primary reference wavelength: 555 nm)

| |f/f1| | |f/f2| | |f/f3| | |f/f4| | |f/f5| | |f/f6| |
|---|---|---|---|---|---|
| 0.3764 | 0.0478 | 0.1081 | 0.2458 | 0.2354 | 0.6208 |
| |f/f7| | ΣPPR | ΣNPR | ΣPPR/|ΣNPR| | IN12/f | IN67/f |
| 0.3495 | 1.3510 | 0.6327 | 2.1352 | 2.8858 | 0.0451 |
| |f1/f2| | |f2/f3| | (TP1 + IN12)/TP2 | | (TP7 + IN67)/TP6 | |
| 0.1271 | 2.2599 | 3.7428 | | 1.0296 | |
| HOS | InTL | HOS/HOI | InS/HOS | ODT % | TDT % |
| 81.6178 | 70.9539 | 13.6030 | 0.3451 | −113.2790 | 84.4806 |
| HVT11 | HVT12 | HVT21 | HVT22 | HVT31 | HVT32 |
| 0.0000 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 0.0000 | 0.0000 | 0.0000 | 0.0000 | 0.0000 |
| PhiA | PhiC | PhiD | TH1 | TH2 | HOI |
| 11.962 mm | 12.362 mm | 12.862 mm | 0.25 mm | 0.2 mm | 6 mm |
| PhiA/PhiD | TH1 + TH2 | (TH1 + TH2)/HOI | (TH1 + TH2)/HOS | 2(TH1 + TH2)/PhiA | InTL/HOS |

-continued

The second optical embodiment (Primary reference wavelength: 555 nm)

| 0.9676 | 0.45 mm | 0.075 | 0.0055 | 0.0752 | 0.8693 |
|---|---|---|---|---|---|
| PSTA | PLTA | NSTA | NLTA | SSTA | SLTA |
| 0.060 mm | −0.005 mm | 0.016 mm | 0.006 mm | 0.020 mm | −0.008 mm |

The values stated as follows may be deduced according to Table 3 and Table 4.

The second optical embodiment (Primary reference wavelength: 555 nm)

| ARE | 1/2(HEP) | ARE value | ARE − 1/2(HEP) | 2(ARE/HEP) % | TP | ARE/TP (%) |
|---|---|---|---|---|---|---|
| 11 | 1.082 | 1.081 | −0.00075 | 99.93% | 4.977 | 21.72% |
| 12 | 1.082 | 1.083 | 0.00149 | 100.14% | 4.977 | 21.77% |
| 21 | 1.082 | 1.082 | 0.00011 | 100.01% | 5.000 | 21.64% |
| 22 | 1.082 | 1.082 | −0.00034 | 99.97% | 5.000 | 21.63% |
| 31 | 1.082 | 1.081 | −0.00084 | 99.92% | 5.000 | 21.62% |
| 32 | 1.082 | 1.081 | −0.00075 | 99.93% | 5.000 | 21.62% |
| 41 | 1.082 | 1.081 | −0.00059 | 99.95% | 4.095 | 26.41% |
| 42 | 1.082 | 1.081 | −0.00067 | 99.94% | 4.095 | 26.40% |
| 51 | 1.082 | 1.082 | −0.00021 | 99.98% | 1.539 | 70.28% |
| 52 | 1.082 | 1.081 | −0.00069 | 99.94% | 1.539 | 70.25% |
| 61 | 1.082 | 1.082 | −0.00021 | 99.98% | 5.000 | 21.63% |
| 62 | 1.082 | 1.082 | 0.00005 | 100.00% | 5.000 | 21.64% |
| 71 | 1.082 | 1.082 | −0.00003 | 100.00% | 4.933 | 21.93% |
| 72 | 1.082 | 1.083 | 0.00083 | 100.08% | 4.933 | 21.95% |

| ARS | EHD | ARS value | ARS − EHD | (ARS/EHD) % | TP | ARS/TP (%) |
|---|---|---|---|---|---|---|
| 11 | 20.767 | 21.486 | 0.719 | 103.46% | 4.977 | 431.68% |
| 12 | 9.412 | 13.474 | 4.062 | 143.16% | 4.977 | 270.71% |
| 21 | 8.636 | 9.212 | 0.577 | 106.68% | 5.000 | 184.25% |
| 22 | 9.838 | 10.264 | 0.426 | 104.33% | 5.000 | 205.27% |
| 31 | 8.770 | 8.772 | 0.003 | 100.03% | 5.000 | 175.45% |
| 32 | 8.511 | 8.558 | 0.047 | 100.55% | 5.000 | 171.16% |
| 41 | 4.600 | 4.619 | 0.019 | 100.42% | 4.095 | 112.80% |
| 42 | 4.965 | 4.981 | 0.016 | 100.32% | 4.095 | 121.64% |
| 51 | 5.075 | 5.143 | 0.067 | 101.33% | 1.539 | 334.15% |
| 52 | 5.047 | 5.062 | 0.015 | 100.30% | 1.539 | 328.89% |
| 61 | 5.011 | 5.075 | 0.064 | 101.28% | 5.000 | 101.50% |
| 62 | 5.373 | 5.489 | 0.116 | 102.16% | 5.000 | 109.79% |
| 71 | 5.513 | 5.625 | 0.112 | 102.04% | 4.933 | 114.03% |
| 72 | 5.981 | 6.307 | 0.326 | 105.44% | 4.933 | 127.84% |

The values stated as follows may be deduced according to Table 3 and Table 4.

Related inflection point values of second optical embodiment (Primary reference wavelength: 555 nm)

| HIF111 | 0 | HIF111/HOI | 0 | SGI111 | 0 | |SGI111|/(|SGI111| + TP1) | 0 |
|---|---|---|---|---|---|---|---|

The Third Optical Embodiment

Figure 9:
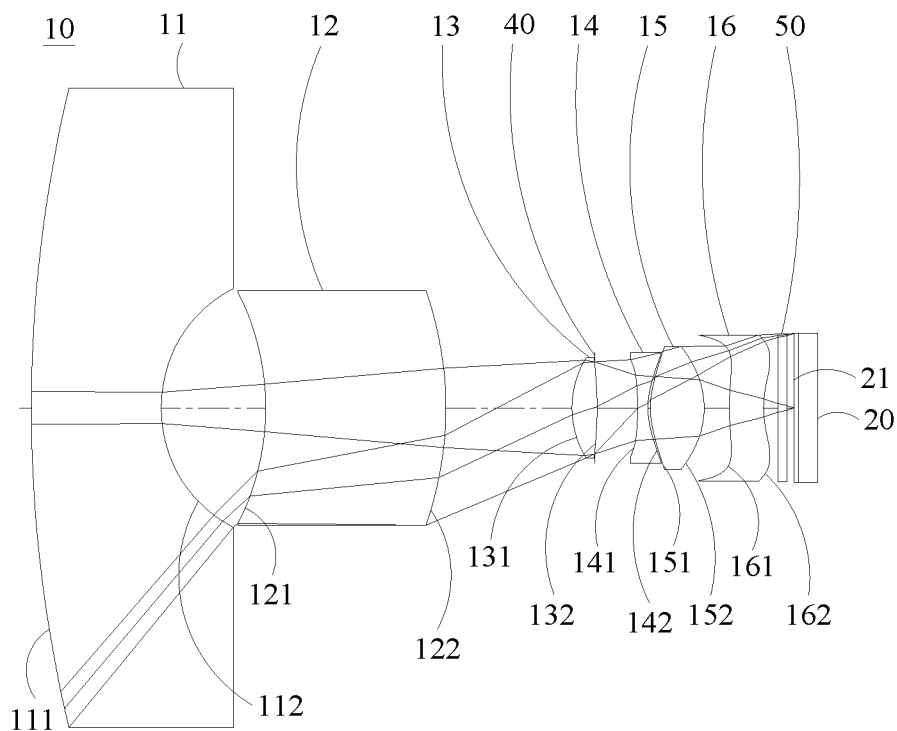
FIG. 9 depicts a configuration diagram of the camera lens of the panoramic image system according to the third embodiment of the present invention.

As shown in FIG. 9, the camera lens L includes six lenses with refractive power, which are a first lens 11, a second lens 12, a third lens 13, a four lens 14, a fifth lens 15, and a sixth lens 16 sequentially displayed from an object side to an image side.

Figure 10:
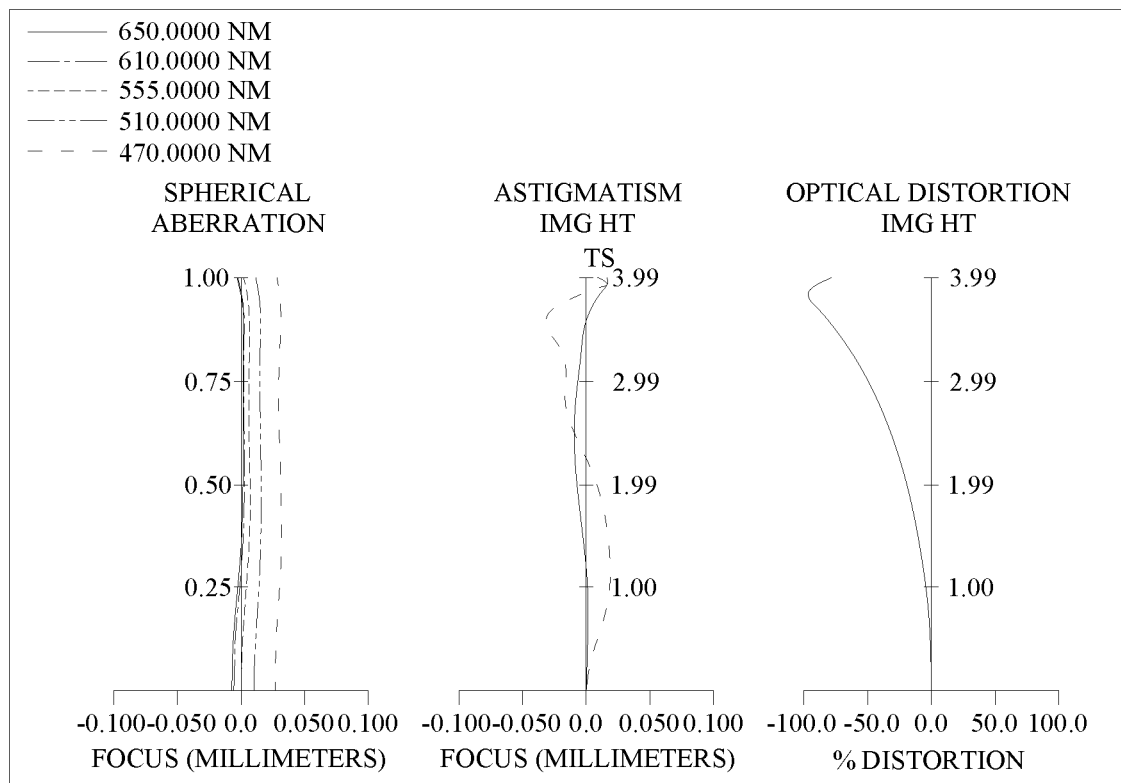
FIG. 10 depicts a curve diagram of the spherical aberration, astigmatism, and optical distortion illustrated sequentially from the left to the right according to the third optical embodiment of the present invention.

Please refer to FIG. 9 and FIG. 10. FIG. 9 depicts a configuration diagram of the camera lens L of the panoramic image system according to the third optical embodiment of the present invention. FIG. 10 depicts a curve diagram of the spherical aberration, astigmatism, and optical distortion illustrated sequentially from the left to the right according to the third optical embodiment of the present invention. As shown in FIG. 9, the camera module 10 includes a first lens 11, a second lens 12, a third lens 13, an aperture 40, a four lens 14, a fifth lens 15, a sixth lens 16, an IR-cut filter 50, an image plane, and optical image sensor S sequentially displayed from an object side to an image side.

The first lens 11 has negative refractive power and is made of a glass material. The object side surface 111 thereof is a convex surface and the image side surface 112 thereof is a concave surface, both of which are spherical.

The second lens 12 has negative refractive power and is made of a glass material. The object side surface thereof 121 is a concave surface and the image side surface thereof 122 is a convex surface, both of which are spherical.

The third lens 13 has positive refractive power and is made of a glass material. The object side surface 131 thereof is a convex surface and the image side surface 132 thereof is a convex surface, both of which are aspheric. The object side surface 334 thereof has an inflection point.

The fourth lens 14 has negative refractive power and is made of a plastic material. The object side surface thereof 141 is a concave surface and the image side surface thereof 142 is a concave surface, both of which are aspheric. The image side surface 142 thereof both have an inflection point.

The fifth lens 15 has positive refractive power and is made of a plastic material. The object side surface 151 thereof is a convex surface and the image side surface 152 thereof is a convex surface, both of which are aspheric.

The sixth lens 16 has negative refractive power and is made of a plastic material. The object side surface 161 thereof is a convex surface and the image side surface 162 thereof is a concave surface. The object side surface 161 and the image side surface 162 thereof both have an inflection point. Therefore, it is advantageous for the lens to reduce the back focal length to maintain minimization. In addition, it is effective to suppress the incident angle with incoming light from an off-axis view field and further correct the aberration in the off-axis view field.

The IR-cut filter 50 is made of glass and is disposed between the sixth lens 16 and the optical image sensor S, which does not affect the focal length of the camera lens L.

Please refer to the following Table 5 and Table 6.

TABLE 5

Data of the third optical embodiment
f = 2.808 mm; f/HEP = 1.6; HAF = 100 deg

| Surface | | Curvature radius | Thickness (mm) | Material |
|---|---|---|---|---|
| 0 | Object | 1E+18 | 1E+18 | |
| 1 | Lens 1 | 71.398124 | 7.214 | Glass |
| 2 | | 7.117272355 | 5.788 | |
| 3 | Lens 2 | −13.29213699 | 10.000 | Glass |
| 4 | | −18.37509887 | 7.005 | |
| 5 | Lens 3 | 5.039114804 | 1.398 | Plastic |
| 6 | | −15.53136631 | −0.140 | |
| 7 | Aperture | 1E+18 | 2.378 | |
| 8 | Lens 4 | −18.68613609 | 0.577 | Plastic |

TABLE 5-continued

Data of the third optical embodiment
f = 2.808 mm; f/HEP = 1.6; HAF = 100 deg

| Surface | | | | | |
|---|---|---|---|---|---|
| 9 | | 4.086545927 | 0.141 | | |
| 10 | Lens 5 | 4.927609282 | 2.974 | Plastic | |
| 11 | | −4.551946605 | 1.389 | | |
| 12 | Lens 6 | 9.184876531 | 1.916 | Plastic | |
| 13 | | 4.845500046 | 0.800 | | |
| 14 | IR-cut filter | 1E+18 | 0.500 | BK_7 | |
| 15 | | 1E+18 | 0.371 | | |
| 16 | image plane | 1E+18 | 0.005 | | |

| Surface | Refractive Index | Dispersion coefficient | Focal length |
|---|---|---|---|
| 0 | | | |
| 1 | 1.702 | 41.15 | −11.765 |
| 2 | | | |
| 3 | 2.003 | 19.32 | −4537.460 |
| 4 | | | |
| 5 | 1.514 | 56.80 | 7.553 |
| 6 | | | |
| 7 | | | |
| 8 | 1.661 | 20.40 | −4.978 |
| 9 | | | |
| 10 | 1.565 | 58.00 | 4.709 |
| 11 | | | |
| 12 | 1.514 | 56.80 | −23.405 |
| 13 | | | |
| 14 | 1.517 | 64.13 | |
| 15 | | | |
| 16 | | | |

Reference wavelength (d-line) = 555 nm

Table 6. The Aspheric Surface Parameters of the Third Optical Embodiment

TABLE 6

Aspheric Coefficients

| | Surface No | | | |
|---|---|---|---|---|
| | 1 | 2 | 3 | 4 |
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10 | 0.000000E+00 | 0.000000E+00 | 0.000000E+00 | 0.000000E+00 |

| | Surface No | | | |
|---|---|---|---|---|
| | 5 | 6 | 8 | 9 |
| k | 1.318519E−01 | 3.120384E+00 | −1.494442E+01 | 2.744228E−02 |
| A4 | 6.405246E−05 | 2.103942E−03 | −1.598286E−03 | −7.291825E−03 |
| A6 | 2.278341E−05 | −1.050629E−04 | −9.177115E−04 | 9.730714E−05 |
| A8 | −3.672908E−06 | 6.168906E−06 | 1.011405E−04 | 1.101816E−06 |
| A10 | 3.748457E−07 | −1.224682E−07 | −4.919835E−06 | −6.849076E−07 |

| | Surface No | | | |
|---|---|---|---|---|
| | 10 | 11 | 12 | 13 |
| k | −7.864013E+00 | −2.263702E+00 | −4.206923E+01 | −7.030803E+00 |
| A4 | 1.405243E−04 | −3.919567E−03 | −1.679499E−03 | −2.640099E−03 |
| A6 | 1.837602E−04 | 2.683449E−04 | −3.518520E−04 | −4.507651E−05 |
| A8 | −2.173368E−05 | −1.229452E−05 | 5.047353E−05 | −2.600391E−05 |
| A10 | 7.328496E−07 | 4.222621E−07 | −3.851055E−06 | 1.161811E−06 |

In the third optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 5 and Table 6.

Third optical embodiment (Primary reference wavelength: 555 nm)

| |f/f1| | |f/f2| | |f/f3| | |f/f4| | |f/f5| | |f/f6| |
|---|---|---|---|---|---|
| 0.23865 | 0.00062 | 0.37172 | 0.56396 | 0.59621 | 0.11996 |
| ΣPPR | ΣNPR | ΣPPR/\|ΣNPR\| | IN12/f | IN56/f | TP4/(IN34 + TP4 + IN45) |
| 1.77054 | 0.12058 | 14.68400 | 2.06169 | 0.49464 | 0.19512 |
| \|f1/f2\| | \|f2/f3\| | (TP1 + IN12)/TP2 | | | (TP6 + IN56)/TP5 |
| 0.00259 | 600.74778 | 1.30023 | | | 1.11131 |
| HOS | InTL | HOS/HOI | InS/HOS | ODT % | TDT % |
| 42.31580 | 40.63970 | 10.57895 | 0.26115 | −122.32700 | 93.33510 |

-continued

| Third optical embodiment (Primary reference wavelength: 555 nm) | | | | | |
|---|---|---|---|---|---|
| HVT51 | HVT52 | HVT61 | HVT62 | HVT62/HOI | HVT62/HOS |
| 0 | 0 | 2.22299 | 2.60561 | 0.65140 | 0.06158 |
| TP2/ TP3 | TP3/ TP4 | InRS61 | InRS62 | \|InRS61\|/ TP6 | \|InRS62\|/TP6 |
| 7.15374 | 2.42321 | −0.20807 | −0.24978 | 0.10861 | 0.13038 |
| PhiA | PhiC | PhiD | TH1 | TH2 | HOI |
| 6.150 mm | 6.41 mm | 6.71 mm | 0.15 mm | 0.13 mm | 4 mm |
| PhiA/ PhiD | TH1 + TH2 | (TH1 + TH2)/ HOI | (TH1 + TH2)/ HOS | 2(TH1 + TH2)/ PhiA | InTL/HOS |
| 0.9165 | 0.28 mm | 0.07 | 0.0066 | 0.0911 | 0.9604 |
| PSTA | PLTA | NSTA | NLTA | SSTA | SLTA |
| 0.014 mm | 0.002 mm | −0.003 mm | −0.002 mm | 0.011 mm | −0.001 mm |

The values related to arc lengths may be obtained according to table 5 and table 6.

| Third optical embodiment (Reference wavelength = 555 nm) | | | | | |
|---|---|---|---|---|---|
| ARE | 1/2(HEP) | ARE value | ARE − 1/2(HEP) | 2(ARE/ HEP) % | TP | ARE/TP (%) |
| 11 | 0.877 | 0.877 | −0.00036 | 99.96% | 7.214 | 12.16% |
| 12 | 0.877 | 0.879 | 0.00186 | 100.21% | 7.214 | 12.19% |
| 21 | 0.877 | 0.878 | 0.00026 | 100.03% | 10.000 | 8.78% |
| 22 | 0.877 | 0.877 | −0.00004 | 100.00% | 10.000 | 8.77% |
| 31 | 0.877 | 0.882 | 0.00413 | 100.47% | 1.398 | 63.06% |
| 32 | 0.877 | 0.877 | 0.00004 | 100.00% | 1.398 | 62.77% |
| 41 | 0.877 | 0.877 | −0.00001 | 100.00% | 0.577 | 152.09% |
| 42 | 0.877 | 0.883 | 0.00579 | 100.66% | 0.577 | 153.10% |
| 51 | 0.877 | 0.881 | 0.00373 | 100.43% | 2.974 | 29.63% |
| 52 | 0.877 | 0.883 | 0.00521 | 100.59% | 2.974 | 29.68% |
| 61 | 0.877 | 0.878 | 0.00064 | 100.07% | 1.916 | 45.83% |
| 62 | 0.877 | 0.881 | 0.00368 | 100.42% | 1.916 | 45.99% |
| ARS | EHD | ARS value | ARS − EHD | (ARS/ EHD) % | TP | ARS/TP (%) |
| 11 | 17.443 | 17.620 | 0.178 | 101.02% | 7.214 | 244.25% |
| 12 | 6.428 | 8.019 | 1.592 | 124.76% | 7.214 | 111.16% |
| 21 | 6.318 | 6.584 | 0.266 | 104.20% | 10.000 | 65.84% |
| 22 | 6.340 | 6.472 | 0.132 | 102.08% | 10.000 | 64.72% |
| 31 | 2.699 | 2.857 | 0.158 | 105.84% | 1.398 | 204.38% |
| 32 | 2.476 | 2.481 | 0.005 | 100.18% | 1.398 | 177.46% |
| 41 | 2.601 | 2.652 | 0.051 | 101.96% | 0.577 | 459.78% |
| 42 | 3.006 | 3.119 | 0.113 | 103.75% | 0.577 | 540.61% |
| 51 | 3.075 | 3.171 | 0.096 | 103.13% | 2.974 | 106.65% |
| 52 | 3.317 | 3.624 | 0.307 | 109.24% | 2.974 | 121.88% |
| 61 | 3.331 | 3.427 | 0.095 | 102.86% | 1.916 | 178.88% |
| 62 | 3.944 | 4.160 | 0.215 | 105.46% | 1.916 | 217.14% |

The values stated as follows may be deduced according to Table 5 and Table 6.

| Related inflection point values of third optical embodiment (Primary reference wavelength: 555 nm) | | | | | | | |
|---|---|---|---|---|---|---|---|
| HIF321 | 2.0367 | HIF321/ HOI | 0.5092 | SGI321 | −0.1056 | \|SGI321\|/ (\|SGI321\| + TP3) | 0.0702 |
| HIF421 | 2.4635 | HIF421/ HOI | 0.6159 | SGI421 | 0.5780 | \|SGI421\|/ (\|SGI421\| + TP4) | 0.5005 |
| HIF611 | 1.2364 | HIF611/ HOI | 0.3091 | SGI611 | 0.0668 | \|SGI611\|/ (\|SGI611\| + TP6) | 0.0337 |
| HIF621 | 1.5488 | HIF621/ HOI | 0.3872 | SGI621 | 0.2014 | \|SGI621\|/ (\|SGI621\| + TP6) | 0.0951 |

The Fourth Optical Embodiment

Figure 11:
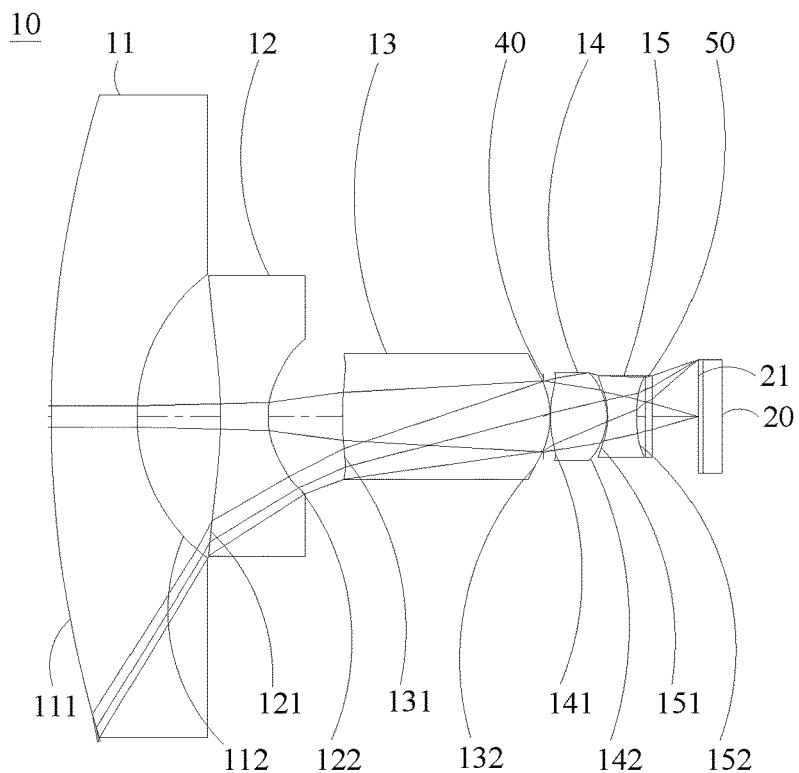
FIG. 11 depicts a configuration diagram of the camera lens of the panoramic image system according to the fourth embodiment of the present invention.

As shown in FIG. 11, the camera lens L may include five lenses with refractive power, which are a first lens 11, a second lens 12, a third lens 13, a four lens 14, a fifth lens 15 sequentially displayed from an object side to an image side.

Figure 12:
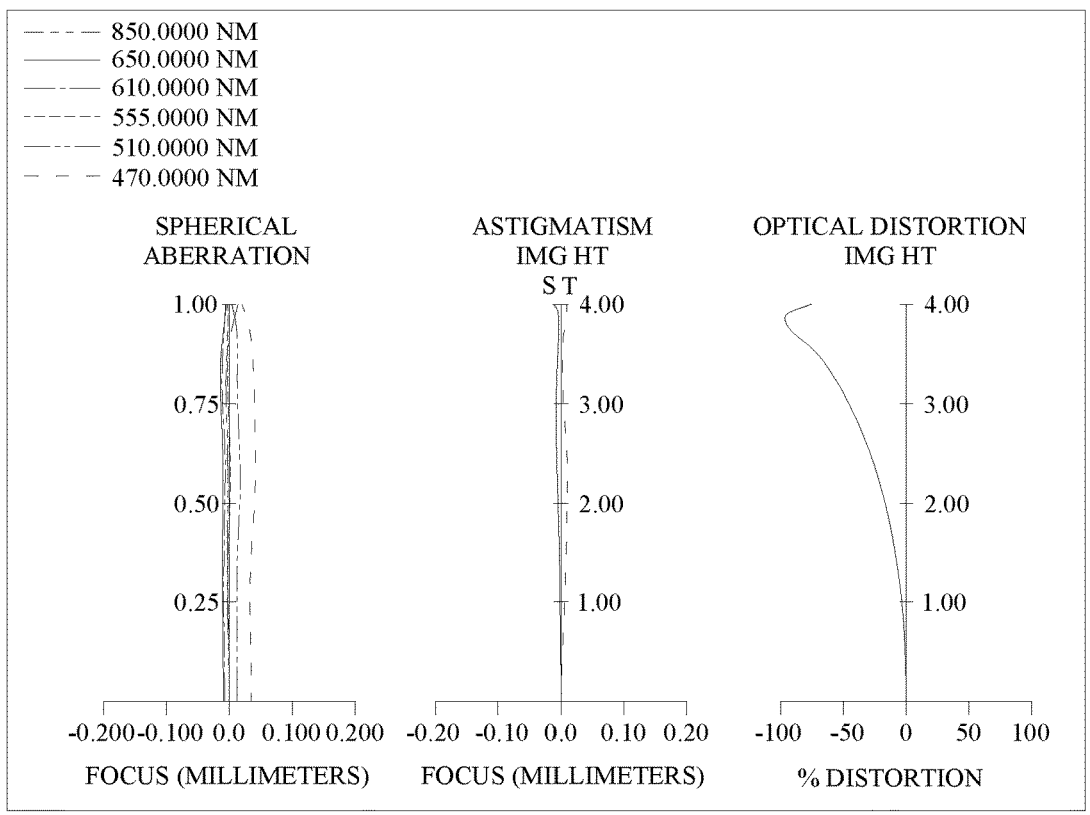
FIG. 12 depicts a curve diagram of the spherical aberration, astigmatism, and optical distortion illustrated sequentially from the left to the right according to the fourth optical embodiment of the present invention.

Please refer to FIG. 11 and FIG. 12. FIG. 11 depicts a configuration diagram of the camera lens L of the panoramic image system according to the fourth optical embodiment of the present invention. FIG. 12 depicts a curve diagram of the spherical aberration, astigmatism, and optical distortion illustrated sequentially from the left to the right according to the fourth optical embodiment of the present invention. As shown in FIG. 11, the camera module 10 includes a first lens 11, a second lens 12, a third lens 13, an aperture 40, a four lens 14, a fifth lens 15, a sixth lens 16, an IR-cut filter 50, an image plane, and optical image sensor S sequentially displayed from an object side to an image side.

The first lens 11 has negative refractive power and is made of a glass material. The object side surface 111 thereof is a convex surface and the image side surface 112 thereof is a concave surface, both of which are spherical.

The second lens 12 has negative refractive power and is made of a plastic material. The object side surface thereof 121 is a concave surface and the image side surface thereof 122 is a concave surface, both of which are aspheric. The object side surface 121 has an inflection point.

The third lens 13 has positive refractive power and is made of a plastic material. The object side surface 131 thereof is a convex surface and the image side surface 132 thereof is a convex surface, both of which are aspheric. The object side surface 131 thereof has an inflection point.

The fourth lens 14 has positive refractive power and is made of a plastic material. The object side surface 141 thereof is a convex surface and the image side surface 142 thereof is a concave surface, both of which are aspheric. The object side surface 141 thereof has an inflection point.

The fifth lens 15 has negative refractive power and is made of a plastic material. The object side surface thereof 151 is a concave surface and the image side surface thereof 152 is a concave surface, both of which are aspheric. The object side surface 151 has two inflection points. Therefore, it is advantageous for the lens to reduce the back focal length to maintain minimization.

The IR-cut filter 50 is made of glass and is disposed between the fifth lens 15 and the optical image sensor S, which does not affect the focal length of the camera lens L.

Please refer to the following Table 7 and Table 8.

TABLE 7

Data of the fourth optical embodiment
f = 2.7883 mm; f/HEP = 1.8; HAF = 101 deg

| Surface | | Curvature radius | Thickness (mm) | Material |
|---|---|---|---|---|
| 0 | Object | 1E+18 | 1E+18 | |
| 1 | Lens 1 | 76.84219 | 6.117399 | Glass |
| 2 | | 12.62555 | 5.924382 | |
| 3 | Lens 2 | −37.0327 | 3.429817 | Plastic |
| 4 | | 5.88556 | 5.305191 | |
| 5 | Lens 3 | 17.99395 | 14.79391 | |
| 6 | | −5.76903 | −0.4855 | Plastic |
| 7 | Aperture | 1E+18 | 0.535498 | |
| 8 | Lens 4 | 8.19404 | 4.011739 | Plastic |
| 9 | | −3.84363 | 0.050366 | |
| 10 | Lens 5 | −4.34991 | 2.088275 | Plastic |
| 11 | | 16.6609 | 0.6 | |
| 12 | IR-cut filter | 1E+18 | 0.5 | BK_7 |
| 13 | | 1E+18 | 3.254927 | |
| 14 | Image plane | 1E+18 | −0.00013 | |

| Surface | Refractive index | Dispersion coefficient | Focal length |
|---|---|---|---|
| 0 | | | |
| 1 | 1.497 | 81.61 | −31.322 |
| 2 | | | |
| 3 | 1.565 | 54.5 | −8.70843 |
| 4 | | | |
| 5 | | | |
| 6 | 1.565 | 58 | 9.94787 |
| 7 | | | |
| 8 | 1.565 | 58 | 5.24898 |
| 9 | | | |
| 10 | 1.661 | 20.4 | −4.97515 |
| 11 | | | |
| 12 | 1.517 | 64.13 | |
| 13 | | | |
| 14 | | | |

Reference wavelength (d-line) = 555 nm

Table 8. The Aspheric Surface Parameters of the Fourth Optical Embodiment

TABLE 8

Aspheric Coefficients

| Surface | | | | |
|---|---|---|---|---|
| | 1 | 2 | 3 | 4 |
| k | 0.000000E+00 | 0.000000E+00 | 0.131249 | −0.069541 |
| A4 | 0.000000E+00 | 0.000000E+00 | 3.99823E−05 | −8.55712E−04 |
| A6 | 0.000000E+00 | 0.000000E+00 | 9.03636E−08 | −1.96175E−06 |
| A8 | 0.000000E+00 | 0.000000E+00 | 1.91025E−09 | −1.39344E−08 |
| A10 | 0.000000E+00 | 0.000000E+00 | −1.18567E−11 | −4.17090E−09 |
| A12 | 0.000000E+00 | 0.000000E+00 | 0.000000E+00 | 0.000000E+00 |

| Surface | | | | |
|---|---|---|---|---|
| | 5 | 6 | 8 | 9 |
| k | −0.324555 | 0.009216 | −0.292346 | −0.18604 |
| A4 | −9.07093E−04 | 8.80963E−04 | −1.02138E−03 | 4.33629E−03 |
| A6 | −1.02465E−05 | 3.14497E−05 | −1.18559E−04 | −2.91588E−04 |
| A8 | −8.18157E−08 | −3.15863E−06 | 1.34404E−05 | 9.11419E−06 |
| A10 | −2.42621E−09 | 1.44613E−07 | −2.80681E−06 | 1.28365E−07 |
| A12 | 0.000000E+00 | 0.000000E+00 | 0.000000E+00 | 0.000000E+00 |

| Surface | | |
|---|---|---|
| | 10 | 11 |
| k | −6.17195 | 27.541383 |
| A4 | 1.58379E−03 | 7.56932E−03 |
| A6 | −1.81549E−04 | −7.83858E−04 |
| A8 | −1.18213E−05 | 4.79120E−05 |
| A10 | 1.92716E−06 | −1.73591E−06 |
| A12 | 0.000000E+00 | 0.000000E+00 |

In the fourth optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 7 and Table 8.

| Fourth optical embodiment (Primary reference wavelength: 555 nm) | | | | | |
|---|---|---|---|---|---|
| |f/f1| | |f/f2| | |f/f3| | |f/f4| | |f/f5| | |f1/f2| |
| 0.08902 | 0.32019 | 0.28029 | 0.53121 | 0.56045 | 3.59674 |
| ΣPPR | ΣNPR | ΣPPR/\|ΣNPR\| | IN12/f | IN45/f | \|f2/f3\| |
| 1.4118 | 0.3693 | 3.8229 | 2.1247 | 0.0181 | 0.8754 |
| TP3/(IN23 + TP3 + IN34) | | (TP1 + IN12)/TP2 | | (TP5 + IN45)/TP4 | |
| 0.73422 | | 3.51091 | | 0.53309 | |
| HOS | InTL | HOS/HOI | InS/HOS | ODT % | TDT % |
| 46.12590 | 41.77110 | 11.53148 | 0.23936 | −125.266 | 99.1671 |
| HVT41 | HVT42 | HVT51 | HVT52 | HVT52/HOI | HVT52/HOS |
| 0.00000 | 0.00000 | 0.00000 | 0.00000 | 0.00000 | 0.00000 |
| TP2/TP3 | TP3/TP4 | InRS51 | InRS52 | \|InRS51\|/TP5 | \|InRS52\|/TP5 |
| 0.23184 | 3.68765 | −0.679265 | 0.5369 | 0.32528 | 0.25710 |
| PhiA | PhiC | PhiD | TH1 | TH2 | HOI |
| 5.598 mm | 5.858 mm | 6.118 mm | 0.13 mm | 0.13 mm | 4 mm |
| PhiA/PhiD | TH1 + TH2 | HOI/HOS | HOS/(TH1 + TH2) | PhiA/2(TH1 + TH2) | InTL/HOS |
| 0.9150 | 0.26 mm | 0.065 | 0.0056 | 0.0929 | 0.9056 |
| PSTA | PLTA | NSTA | NLTA | SSTA | SLTA |
| −0.011 mm | 0.005 mm | −0.010 mm | −0.003 mm | 0.005 mm | −0.00026 mm |

The values related to arc lengths may be obtained according to table 7 and table 8.

| Fourth optical embodiment (Reference wavelength = 555 nm) | | | | | |
|---|---|---|---|---|---|
| ARE | 1/2(HEP) | ARE value | ARE − 1/2(HEP) | 2(ARE/ HEP) % | TP | ARE/ TP (%) |
| 11 | 0.775 | 0.774 | −0.00052 | 99.93% | 6.117 | 12.65% |
| 12 | 0.775 | 0.774 | −0.00005 | 99.99% | 6.117 | 12.66% |
| 21 | 0.775 | 0.774 | −0.00048 | 99.94% | 3.430 | 22.57% |
| 22 | 0.775 | 0.776 | 0.00168 | 100.22% | 3.430 | 22.63% |
| 31 | 0.775 | 0.774 | −0.00031 | 99.96% | 14.794 | 5.23% |
| 32 | 0.775 | 0.776 | 0.00177 | 100.23% | 14.794 | 5.25% |
| 41 | 0.775 | 0.775 | 0.00059 | 100.08% | 4.012 | 19.32% |
| 42 | 0.775 | 0.779 | 0.00453 | 100.59% | 4.012 | 19.42% |
| 51 | 0.775 | 0.778 | 0.00311 | 100.40% | 2.088 | 37.24% |
| 52 | 0.775 | 0.774 | −0.00014 | 99.98% | 2.088 | 37.08% |

| ARS | EHD | ARS value | ARS − EHD | (ARS/ EHD) % | TP | ARS/TP (%) |
|---|---|---|---|---|---|---|
| 11 | 23.038 | 23.397 | 0.359 | 101.56% | 6.117 | 382.46% |
| 12 | 10.140 | 11.772 | 1.632 | 116.10% | 6.117 | 192.44% |
| 21 | 10.138 | 10.178 | 0.039 | 100.39% | 3.430 | 296.74% |
| 22 | 5.537 | 6.337 | 0.800 | 114.44% | 3.430 | 184.76% |
| 31 | 4.490 | 4.502 | 0.012 | 100.27% | 14.794 | 30.43% |
| 32 | 2.544 | 2.620 | 0.076 | 102.97% | 14.794 | 17.71% |
| 41 | 2.735 | 2.759 | 0.024 | 100.89% | 4.012 | 68.77% |
| 42 | 3.123 | 3.449 | 0.326 | 110.43% | 4.012 | 85.97% |
| 51 | 2.934 | 3.023 | 0.089 | 103.04% | 2.088 | 144.74% |
| 52 | 2.799 | 2.883 | 0.084 | 103.00% | 2.088 | 138.08% |

The values stated as follows may be deduced according to Table 7 and Table 8.

| Related inflection point values of fourth optical embodiment (Primary reference wavelength: 555 nm) | | | | | | |
|---|---|---|---|---|---|---|
| HIF211 | 6.3902 | HIF211/ HOI | 1.5976 | SGI211 | −0.4793 | \|SGI211\|/ (\|SGI211\| + TP2) | 0.1226 |
| HIF311 | 2.1324 | HIF311/ HOI | 0.5331 | SGI311 | 0.1069 | \|SGI311\|/ (\|SGI311\| + TP3) | 0.0072 |
| HIF411 | 2.0278 | HIF411/ HOI | 0.5070 | SGI411 | 0.2287 | \|SGI411\|/ (\|SGI411\| + TP4) | 0.0539 |
| HIF511 | 2.6253 | HIF511/ HOI | 0.6563 | SGI511 | −0.5681 | \|SGI511\|/ (\|SGI511\| + TP5) | 0.2139 |
| HIF512 | 2.1521 | HIF512/ HOI | 0.5380 | SGI512 | −0.8314 | \|SGI512\|/ (\|SGI512\| + TP5) | 0.2848 |

The Fifth Optical Embodiment

Figure 13:
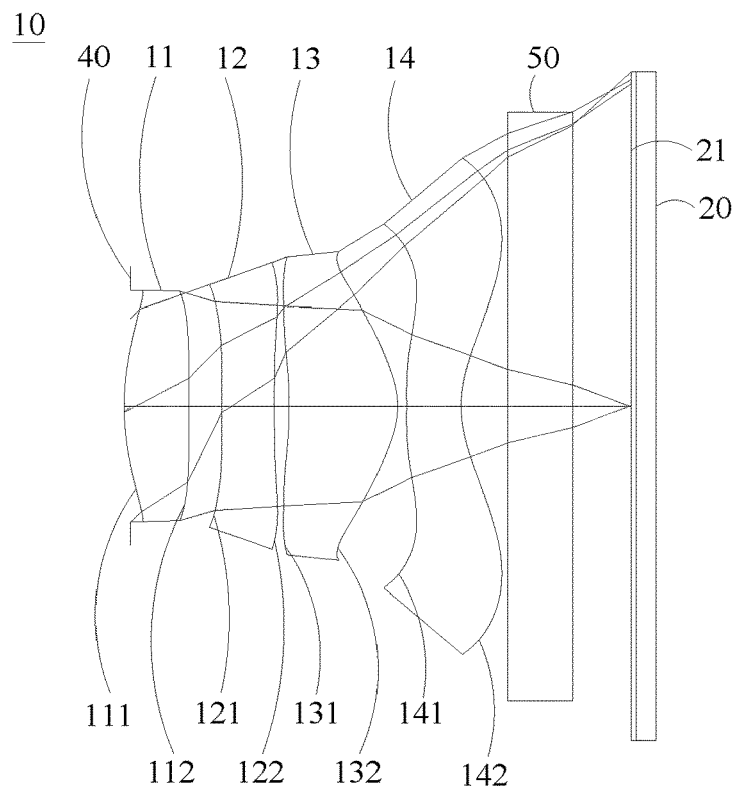
FIG. 13 depicts a configuration diagram of the camera lens of the panoramic image system according to the fifth embodiment of the present invention.

As shown in FIG. 13, the camera lens L includes fourth lenses with refractive power, which are a first lens 11, a second lens 12, a third lens 13, and a four lens 14 sequentially displayed from an object side to an image side.

Figure 14:
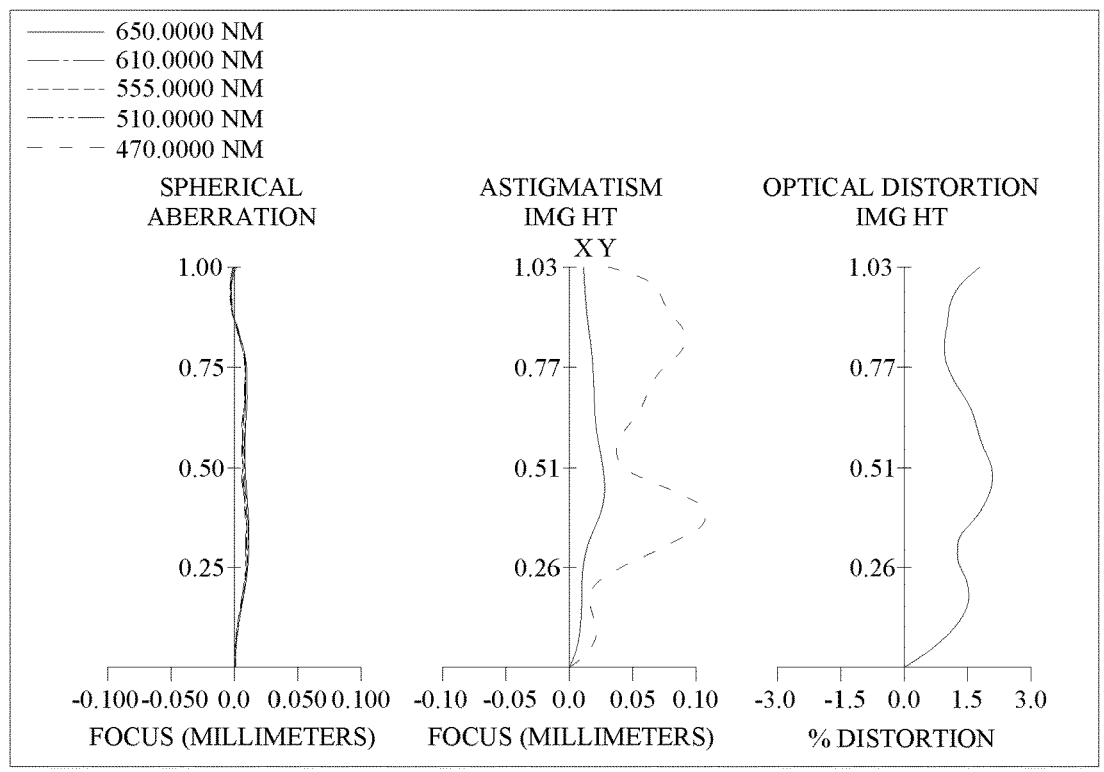
FIG. 14 depicts a curve diagram of the spherical aberration, astigmatism, and optical distortion illustrated sequentially from the left to the right according to the fifth optical embodiment of the present invention.

Please refer to FIG. 13 and FIG. 14. FIG. 13 depicts a configuration diagram of the camera lens L of the panoramic image system according to the fifth optical embodiment of the present invention. FIG. 14 depicts a curve diagram of the spherical aberration, astigmatism, and optical distortion illustrated sequentially from the left to the right according to the fifth optical embodiment of the present invention. As shown in FIG. 13, the camera module 10 includes an aperture 40, a first lens 11, a second lens 12, a third lens 13, a four lens 14, an IR-cut filter 50, an image plane, and optical image sensor S sequentially displayed from an object side to an image side.

The first lens 11 has positive refractive power and is made of a plastic material. The object side surface 111 thereof is a convex surface and the image side surface 112 thereof is a convex surface, both of which are aspheric. The object side surface 111 thereof has an inflection point.

The second lens 12 has negative refractive power and is made of a plastic material. The object side surface thereof 121 is a convex surface and the image side surface thereof 122 is a concave surface, both of which are aspheric. The object side surface 121 has two inflection points and the image side surface 122 thereof has an inflection point.

The third lens 13 has positive refractive power and is made of a plastic material. The object side surface 131 thereof is a concave surface and the image side surface 132 thereof is a convex surface, both of which are aspheric. The object side surface 131 thereof has three inflection points and the image side surface 132 thereof has an inflection point.

The fourth lens 14 has negative refractive power and is made of a plastic material. The object side surface thereof 141 is a concave surface and the image side surface thereof 142 is a concave surface, both of which are aspheric. The object side surface thereof 141 has two inflection points and the image side surface 142 thereof has an inflection point.

The IR-cut filter 50 is made of glass and is disposed between the fourth lens 14 and the optical image sensor S, which does not affect the focal length of the camera lens L.

Please refer to the following Table 9 and Table 10.

TABLE 9

| Data of the fifth optical embodiment f = 1.04102 mm; f/HEP = 1.4; HAF = 44.0346 deg | | | |
|---|---|---|---|
| Surface | Curvature Radius | Thickness (mm) | Material |
| 0 | Object | 1E+18 | 600 |
| 1 | Aperture | 1E+18 | −0.020 |

TABLE 9-continued

| | | | | |
|---|---|---|---|---|
| 2 | Lens 1 | 0.890166851 | 0.210 | Plastic |
| 3 | | −29.11040115 | −0.010 | |
| 4 | | 1E+18 | 0.116 | |
| 5 | Lens 2 | 10.67765398 | 0.170 | Plastic |
| 6 | | 4.977771922 | 0.049 | |
| 7 | Lens 3 | −1.191436932 | 0.349 | Plastic |
| 8 | | −0.248990674 | 0.030 | |
| 9 | Lens 4 | −38.08537212 | 0.176 | Plastic |
| 10 | | 0.372574476 | 0.152 | |
| 11 | IR-cut filter | 1E+18 | 0.210 | BK_7 |
| 12 | | 1E+18 | 0.185 | |
| 13 | Image plane | 1E+18 | 0.005 | |

Data of the optical image capturing module of the fifth optical embodiment
f = 1.04102 mm; f/HEP = 1.4; HAF = 44.0346 deg

| Surface | Refractive index | Dispersion coefficient | Focal length |
|---|---|---|---|
| 0 | | | |
| 1 | | | |
| 2 | 1.545 | 55.96 | 1.587 |
| 3 | | | |
| 4 | | | |
| 5 | 1.642 | 22.46 | −14.569 |
| 6 | | | |
| 7 | 1.545 | 55.96 | 0.510 |
| 8 | | | |
| 9 | 1.642 | 22.46 | −0.569 |
| 10 | | | |
| 11 | 1.517 | 64.13 | |
| 12 | | | |
| 13 | | | |

Reference wavelength (d-line) = 555 nm.
Shield position: The radius of the clear aperture of the fourth surface is 0.360 mm.

Table 10. The Aspheric Surface Parameters of the Fifth Optical Embodiment

TABLE 10

Aspheric Coefficients

| | Surface | | | |
|---|---|---|---|---|
| | 2 | 3 | 5 | 6 |
| k = | −1.106629E+00 | 2.994179E−07 | −7.788754E+01 | −3.440335E+01 |
| A4 = | 8.291155E−01 | −6.401113E−01 | −4.958114E+00 | −1.875957E+00 |
| A6= | −2.398799E+01 | −1.265726E+01 | 1.299769E+02 | 8.568480E+01 |
| A8 = | 1.825378E+02 | 8.457286E+01 | −2.736977E+03 | −1.279044E+03 |
| A10= | −6.211133E+02 | −2.157875E+02 | 2.908537E+04 | 8.661312E+03 |
| A12 = | −4.719066E+02 | −6.203600E+02 | −1.499597E+05 | −2.875274E+04 |
| A14 = | 0.000000E+00 | 0.000000E+00 | 2.992026E+05 | 3.764871E+04 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

| | Surface | | | |
|---|---|---|---|---|
| | 7 | 8 | 9 | 10 |
| k = | −8.522097E−01 | −4.735945E+00 | −2.277155E+01 | −8.039778E−01 |
| A4 = | −4.878227E−01 | −2.490377E+00 | 1.672704E+01 | −7.613206E+00 |
| A6= | 1.291242E+02 | 1.524149E+02 | −3.260722E+02 | 3.374046E+01 |
| A8 = | −1.979689E+03 | −4.841033E+03 | 3.373231E+03 | −1.368453E+02 |
| A10= | 1.456076E+04 | 8.053747E+04 | −2.177676E+04 | 4.049486E+02 |
| A12 = | −5.975920E+04 | −7.936887E+05 | 8.951687E+04 | −9.711797E+02 |
| A14 = | 1.351676E+05 | 4.811528E+06 | −2.363737E+05 | 1.942574E+03 |
| A16 = | −1.329001E+05 | −1.762293E+07 | 3.983151E+05 | −2.876356E+03 |
| A18 = | 0.000000E+00 | 3.579891E+07 | −4.090689E+05 | 2.562386E+03 |
| A20 = | 0.000000E+00 | −3.094006E+07 | 2.056724E+05 | −9.943657E+02 |

In the fifth optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 9 and Table 10.

Fifth optical embodiment (Primary reference wavelength: 555 nm)

| InRS41 | InRS42 | HVT41 | HVT42 | ODT % | TDT % |
|---|---|---|---|---|---|
| −0.07431 | 0.00475 | 0.00000 | 0.53450 | 2.09403 | 0.84704 |
| |f/f1| | |f/f2| | |f/f3| | |f/f4| | |f1/f2| | |f2/f3| |
| 0.65616 | 0.07145 | 2.04129 | 1.83056 | 0.10890 | 28.56826 |
| ΣPPR | ΣNPR | ΣPPR/|ΣNPR| | ΣPP | ΣNP | f1/ΣPP |
| 2.11274 | 2.48672 | 0.84961 | −14.05932 | 1.01785 | 1.03627 |

-continued

| Fifth optical embodiment (Primary reference wavelength: 555 nm) | | | | | |
|---|---|---|---|---|---|
| f4/ΣNP | IN12/f | IN23/f | IN34/f | TP3/f | TP4/f |
| 1.55872 | 0.10215 | 0.04697 | 0.02882 | 0.33567 | 0.16952 |
| InTL | HOS | HOS/HOI | InS/HOS | InTL/HOS | ΣTP/InTL |
| 1.09131 | 1.64329 | 1.59853 | 0.98783 | 0.66410 | 0.83025 |
| (TP1 + IN12)/TP2 | (TP4 + IN34)/TP3 | TP1/TP2 | TP3/TP4 | IN23/(TP2 + IN23 + TP3) | |
| 1.86168 | 0.59088 | 1.23615 | 1.98009 | 0.08604 | |
| \|InRS41\|/TP4 | \|InRS42\|/TP4 | HVT42/HOS | HVT42/HOI | InTL/HOS | |
| 0.4211 | 0.0269 | 0.5199 | 0.3253 | 0.6641 | |
| PhiA | PhiC | PhiD | TH1 | TH2 | HOI |
| 1.596 mm | 1.996 mm | 2.396 mm | 0.2 mm | 0.2 mm | 1.028 mm |
| PhiA/PhiD | TH1 + TH2 | (TH1 + TH2)/HOI | (TH1 + TH2)/HOS | 2(TH1 + TH2)/PhiA | |
| 0.7996 | 0.4 mm | 0.3891 | 0.2434 | 0.5013 | |
| PSTA | PLTA | NSTA | NLTA | SSTA | SLTA |
| −0.029 mm | −0.023 mm | −0.011 mm | −0.024 mm | 0.010 mm | 0.011 mm |

The values stated as follows may be deduced according to Table 9 and Table 10.

| Related inflection point values of fifth optical embodiment (Primary reference wavelength: 555 nm) | | | | | | | |
|---|---|---|---|---|---|---|---|
| HIF111 | 0.28454 | HIF111/HOI | 0.27679 | SGI111 | 0.04361 | \|SGI111\|/(\|SGI111\| + TP1) | 0.17184 |
| HIF211 | 0.04198 | HIF211/HOI | 0.04083 | SGI211 | 0.00007 | \|SGI211\|/(\|SGI211\| + TP2) | 0.00040 |
| HIF212 | 0.37903 | HIF212/HOI | 0.36871 | SGI212 | −0.03682 | \|SGI212\|/(\|SGI212\| + TP2) | 0.17801 |
| HIF221 | 0.25058 | HIF221/HOI | 0.24376 | SGI221 | 0.00695 | \|SGI221\|/(\|SGI221\| + TP2) | 0.03927 |
| HIF311 | 0.14881 | HIF311/HOI | 0.14476 | SGI311 | −0.00854 | \|SGI311\|/(\|SGI311\| + TP3) | 0.02386 |
| HIF312 | 0.31992 | HIF312/HOI | 0.31120 | SGI312 | −0.01783 | \|SGI312\|/(\|SGI312\| + TP3) | 0.04855 |
| HIF313 | 0.32956 | HIF313/HOI | 0.32058 | SGI313 | −0.01801 | \|SGI313\|/(\|SGI313\| + TP3) | 0.04902 |
| HIF321 | 0.36943 | HIF321/HOI | 0.35937 | SGI321 | −0.14878 | \|SGI321\|/(\|SGI321\| + TP3) | 0.29862 |
| HIF411 | 0.01147 | HIF411/HOI | 0.01116 | SGI411 | −0.00000 | \|SGI411\|/(\|SGI411\| + TP4) | 0.00001 |
| HIF412 | 0.22405 | HIF412/HOI | 0.21795 | SGI412 | 0.01598 | \|SGI412\|/(\|SGI412\| + TP4) | 0.08304 |
| HIF421 | 0.24105 | HIF421/HOI | 0.23448 | SGI421 | 0.05924 | \|SGI421\|/(\|SGI421\| + TP4) | 0.25131 |

The values related to arc lengths may be obtained according to table 9 and Table 10.

| Fifth optical embodiment (Reference wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.372 | 0.375 | 0.00267 | 100.72% | 0.170 | 220.31% |
| 22 | 0.372 | 0.371 | −0.00060 | 99.84% | 0.170 | 218.39% |
| 31 | 0.372 | 0.372 | −0.00023 | 99.94% | 0.349 | 106.35% |
| 32 | 0.372 | 0.404 | 0.03219 | 108.66% | 0.349 | 115.63% |
| 41 | 0.372 | 0.373 | 0.00112 | 100.30% | 0.176 | 211.35% |
| 42 | 0.372 | 0.387 | 0.01533 | 104.12% | 0.176 | 219.40% |
| ARS | EHD | ARS value | ARS − EHD | (ARS/EHD) % | TP | ARS/TP (%) |
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.387 | 0.391 | 0.00383 | 100.99% | 0.170 | 229.73% |
| 22 | 0.458 | 0.460 | 0.00202 | 100.44% | 0.170 | 270.73% |
| 31 | 0.476 | 0.478 | 0.00161 | 100.34% | 0.349 | 136.76% |
| 32 | 0.494 | 0.538 | 0.04435 | 108.98% | 0.349 | 154.02% |
| 41 | 0.585 | 0.624 | 0.03890 | 106.65% | 0.176 | 353.34% |
| 42 | 0.798 | 0.866 | 0.06775 | 108.49% | 0.176 | 490.68% |

The Sixth Optical Embodiment

Figure 15:
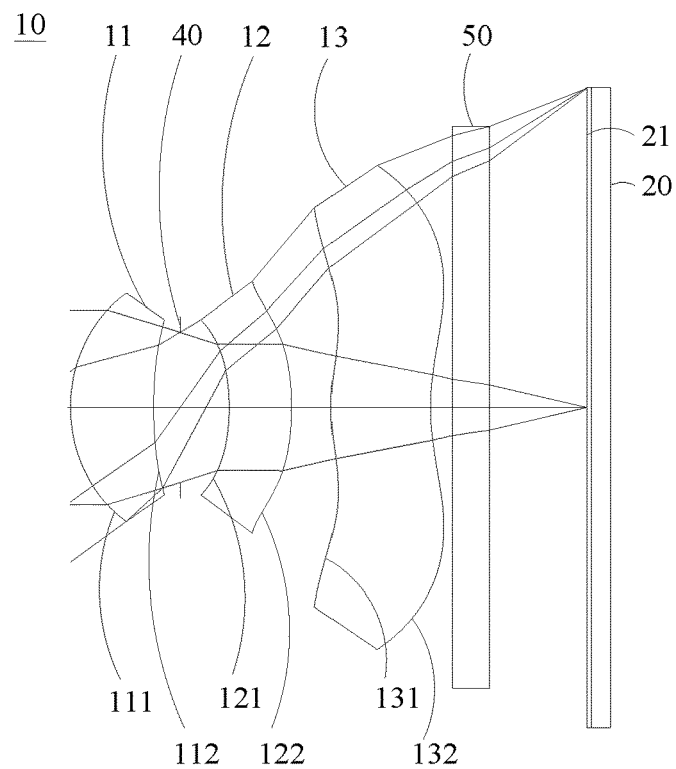
FIG. 15 depicts a configuration diagram of the camera lens of the panoramic image system according to the sixth embodiment of the present invention.
Figure 16:
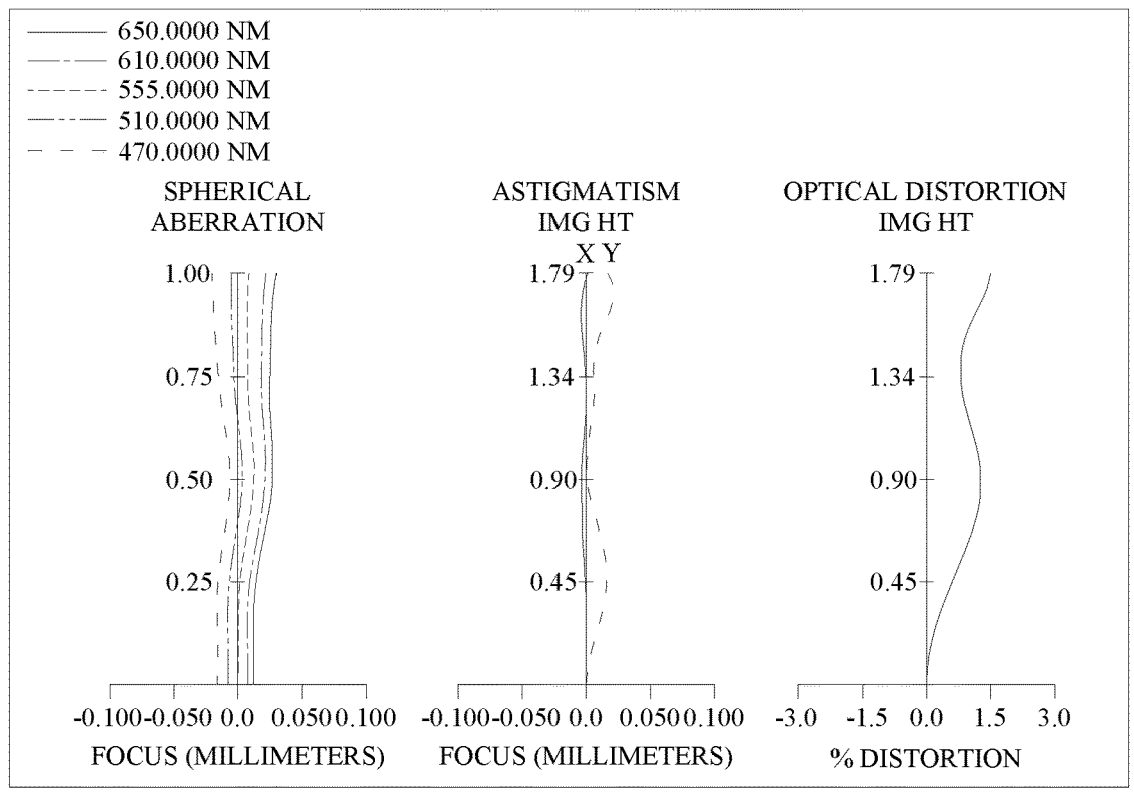
FIG. 16 depicts a curve diagram of the spherical aberration, astigmatism, and optical distortion illustrated sequentially from the left to the right according to the sixth optical embodiment of the present invention.

Please refer to FIG. 15 and FIG. 16. FIG. 15 depicts a configuration diagram of the camera lens L of the panoramic image system according to the sixth optical embodiment of the present invention. FIG. 16 depicts a curve diagram of the spherical aberration, astigmatism, and optical distortion illustrated sequentially from the left to the right according to the sixth optical embodiment of the present invention. As shown in FIG. 15, the camera module 10 includes a first lens 11, an aperture 40, a second lens 12, a third lens 13, an IR-cut filter 50, an image plane, and optical image sensor S sequentially displayed from an object side to an image side.

The first lens 11 has positive refractive power and is made of a plastic material. The object side surface 111 thereof is a convex surface and the image side surface 112 thereof is a concave surface, both of which are aspheric.

The second lens 12 has negative refractive power and is made of a plastic material. The object side surface thereof 121 is a concave surface and the image side surface thereof 122 is a convex surface, both of which are aspheric. The image side surface 122 thereof both has an inflection point.

The third lens 13 has positive refractive power and is made of a plastic material. The object side surface 131 thereof is a convex surface and the image side surface 132 thereof is a concave surface, both of which are aspheric. The object side surface 131 thereof has two inflection points and the image side surface 132 thereof has an infection point.

The IR-cut filter 50 is made of glass and is disposed between the third lens 13 and the optical image sensor S, which does not affect the focal length of the camera lens L.

Please refer to the following Table 11 and Table 12.

TABLE 11

Data of the sixth optical embodiment
f = 2.41135 mm; f/HEP = 2.22; HAF = 36 deg

| Surface | | Curvature radius | Thickness (mm) | Material |
|---|---|---|---|---|
| 0 | Object | 1E+18 | 600 | |
| 1 | Lens 1 | 0.840352226 | 0.468 | Plastic |
| 2 | | 2.271975602 | 0.148 | |

TABLE 11-continued

Data of the sixth optical embodiment
f = 2.41135 mm; f/HEP = 2.22; HAF = 36 deg

| 3 | Aperture | 1E+18 | 0.277 | |
|---|---|---|---|---|
| 4 | Lens 2 | −1.157324239 | 0.349 | Plastic |
| 5 | | −1.968404008 | 0.221 | |
| 6 | Lens 3 | 1.151874235 | 0.559 | Plastic |
| 7 | | 1.338105159 | 0.123 | |
| 8 | IR-cut filter | 1E+18 | 0.210 | BK7 |
| 9 | | 1E+18 | 0.547 | |
| 10 | Image plane | 1E+18 | 0.000 | |

| Surface | Refractive index | Dispersion coefficient | Focal length |
|---|---|---|---|
| 0 | | | |
| 1 | 1.535 | 56.27 | 2.232 |
| 2 | | | |
| 3 | | | |
| 4 | 1.642 | 22.46 | −5.221 |
| 5 | | | |
| 6 | 1.544 | 56.09 | 7.360 |
| 7 | | | |
| 8 | 1.517 | 64.13 | |
| 9 | | | |
| 10 | | | |

Reference wavelength (d-line) = 555 nm.
Shield position: The radius of the clear aperture of the first surface is 0.640 mm Table 12. The Aspheric Surface Parameters of the Sixth Optical Embodiment

TABLE 12

Aspheric Coefficients

| | Surface | | | |
|---|---|---|---|---|
| | 1 | 2 | 4 | 5 |
| k = | −2.019203E−01 | 1.528275E+01 | 3.743939E+00 | −1.207814E+01 |
| A4 = | 3.944883E−02 | −1.670490E−01 | −4.266331E−01 | −1.696843E+00 |
| A6= | 4.774062E−01 | 3.857435E+00 | −1.423859E+00 | 5.164775E+00 |
| A8 = | −1.528780E+00 | −7.091408E+01 | 4.119587E+01 | −1.445541E+01 |
| A10= | 5.133947E+00 | 6.365801E+02 | −3.456462E+02 | 2.876958E+01 |
| A12 = | −6.250496E+00 | −3.141002E+03 | 1.495452E+03 | −2.662400E+01 |
| A14= | 1.068803E+00 | 7.962834E+03 | −2.747802E+03 | 1.661634E+01 |
| A16 = | 7.995491E+00 | −8.268637E+03 | 1.443133E+03 | −1.327827E+01 |

| | Surface | |
|---|---|---|
| | 6 | 7 |
| k = | −1.276860E+01 | −3.034004E+00 |
| A4 = | −7.396546E−01 | −5.308488E−01 |
| A6= | 4.449101E−01 | 4.374142E−01 |
| A8 = | 2.622372E−01 | −3.111192E−01 |
| A10= | −2.510946E−01 | 1.354257E−01 |
| A12 = | −1.048030E−01 | −2.652902E−02 |
| A14= | 1.462137E−01 | −1.203306E−03 |
| A16 = | −3.676651E−02 | 7.805611E−04 |

In the sixth optical embodiment, the aspheric surface formula is presented in the same way in the first optical embodiment. In addition, the definitions of parameters in following tables are the same as those in the first optical embodiment. Therefore, similar description shall not be illustrated again.

The values stated as follows may be deduced according to Table 11 and Table 12.

| Sixth optical embodiment (Primary reference wavelength: 555 nm) | | | | | |
|---|---|---|---|---|---|
| |f/f1| | |f/f2| | |f/f3| | |f1/f2| | |f2/f3| | TP1/TP2 |
| 1.08042 | 0.46186 | 0.32763 | 2.33928 | 1.40968 | 1.33921 |
| ΣPPR | ΣNPR | ΣPPR/\|ΣNPR\| | IN12/f | IN23/f | TP2/TP3 |
| 1.40805 | 0.46186 | 3.04866 | 0.17636 | 0.09155 | 0.62498 |
| TP2/(IN12 + TP2 + IN23) | | (TP1 + IN12)/TP2 | | (TP3 + IN23)/TP2 | |
| 0.35102 | | 2.23183 | | 2.23183 | |
| HOS | InTL | HOS/HOI | InS/HOS | \|ODT\| % | \|TDT\| % |
| 2.90175 | 2.02243 | 1.61928 | 0.78770 | 1.50000 | 0.71008 |
| HVT21 | HVT22 | HVT31 | HVT32 | HVT32/HOI | HVT32/HOS |
| 0.00000 | 0.00000 | 0.46887 | 0.67544 | 0.37692 | 0.23277 |
| PhiA | PhiC | PhiD | TH1 | TH2 | HOI |
| 2.716 mm | 3.116 mm | 3.616 mm | 0.25 mm | 0.2 mm | 1.792 mm |
| PhiA/PhiD | TH1 + TH2 | (TH1 + TH2)/HOI | (TH1 + TH2)/HOS | 2(TH1 + TH2)/PhiA | InTL/HOS |
| 0.7511 | 0.45 mm | 0.2511 | 0.1551 | 0.3314 | 0.6970 |
| PLTA | PSTA | NLTA | NSTA | SLTA | SSTA |
| −0.002 mm | 0.008 mm | 0.006 mm | −0.008 mm | −0.007 mm | 0.006 mm |

The values stated as follows may be deduced according to Table 11 and Table 12.

| Related inflection point values of sixth optical embodiment (Primary reference wavelength: 555 nm) | | | | | | |
|---|---|---|---|---|---|---|
| HIF221 | 0.5599 | HIF221/HOI | 0.3125 | SGI221 | −0.1487 | \|SGI221\|/(\|SGI221\| + TP2) | 0.2412 |
| HIF311 | 0.2405 | HIF311/HOI | 0.1342 | SGI311 | 0.0201 | \|SGI311\|/(\|SGI311\| + TP3) | 0.0413 |
| HIF312 | 0.8255 | HIF312/HOI | 0.4607 | SGI312 | −0.0234 | \|SGI312\|/(\|SGI312\| + TP3) | 0.0476 |
| HIF321 | 0.3505 | HIF321/HOI | 0.1956 | SGI321 | 0.0371 | \|SGI321\|/(\|SGI321\| + TP3) | 0.0735 |

The values related to arc lengths may be obtained according to Table 11 and Table 12.

| Sixth optical embodiment (Reference wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.546 | 0.598 | 0.052 | 109.49% | 0.468 | 127.80% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.546 | 0.572 | 0.026 | 104.78% | 0.349 | 163.78% |
| 31 | 0.546 | 0.548 | 0.002 | 100.36% | 0.559 | 98.04% |
| 32 | 0.546 | 0.550 | 0.004 | 100.80% | 0.559 | 98.47% |
| ARS | EHD | ARS value | ARS − EHD | (ARS/EHD) % | TP | ARS/TP (%) |
| 11 | 0.640 | 0.739 | 0.099 | 115.54% | 0.468 | 158.03% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.706 | 0.750 | 0.044 | 106.28% | 0.349 | 214.72% |
| 31 | 1.118 | 1.135 | 0.017 | 101.49% | 0.559 | 203.04% |
| 32 | 1.358 | 1.489 | 0.131 | 109.69% | 0.559 | 266.34% |

Figure 17:
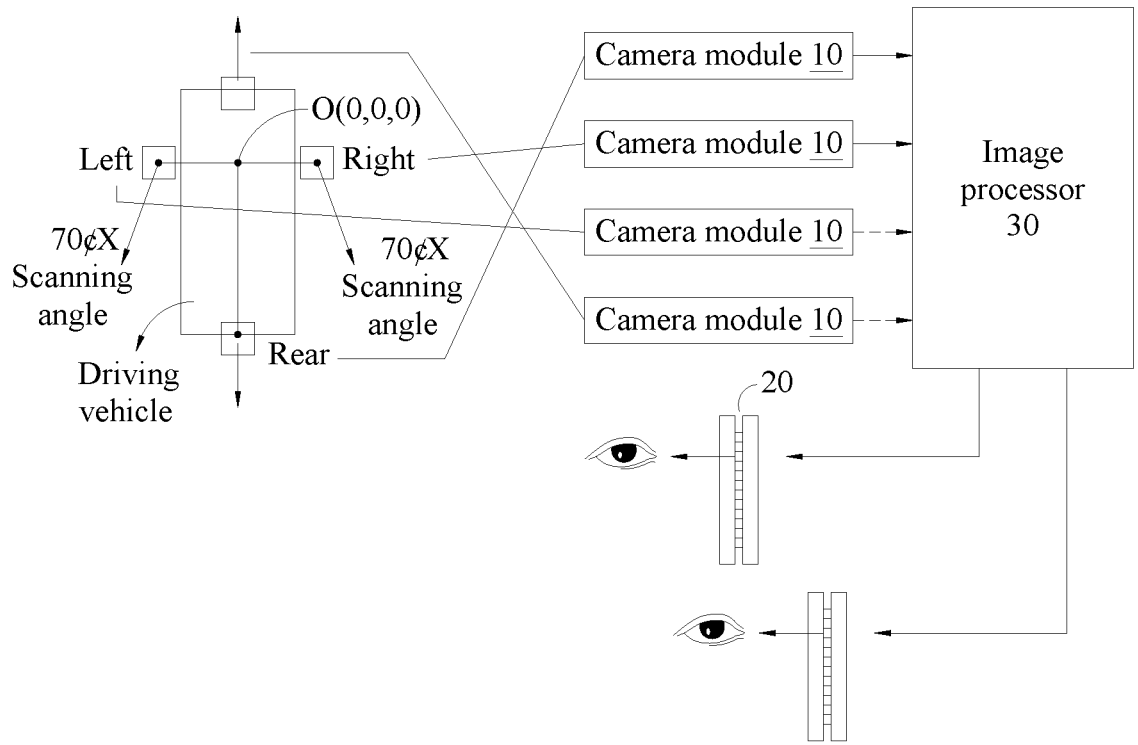
FIG. 17 depicts a configuration diagram of the driver assistance system according to the present invention.

Please refer to FIG. 17 which depicts a configuration diagram of the driver assistance system according to the present invention. As shown in FIG. 17, at least two camera modules 10, at least two display elements 20, and an image processor 30 are provided. Each camera module 10 is respectively disposed on the left side, the right side, the front side, and the rear side of the driving vehicle; each camera module 10 includes a lens L and an optical image sensor S; the optical image sensor S is disposed on the optical axis of the lens L and takes a rear field of view or side field of view to obtain a view image. Each of the display elements 20 is the electrochromic mirror as mentioned above and is electrically connected to each of the optical image sensors S to display each view image; each view image has an overlapping region. The image processor 30 is electrically connected to each of the optical image sensors S and each of the display elements 20, receives each of the view images, and pieces each of the view images into a panoramic image according to each of the overlapping regions. The image processor 30 determines that a vehicle or a pedestrian of the panoramic image approaches or stays away from a driving vehicle according to the panoramic image. This enables the driver to instantly know the relative position of the cars coming behind, thus preventing traffic accidents.

Figure 18:
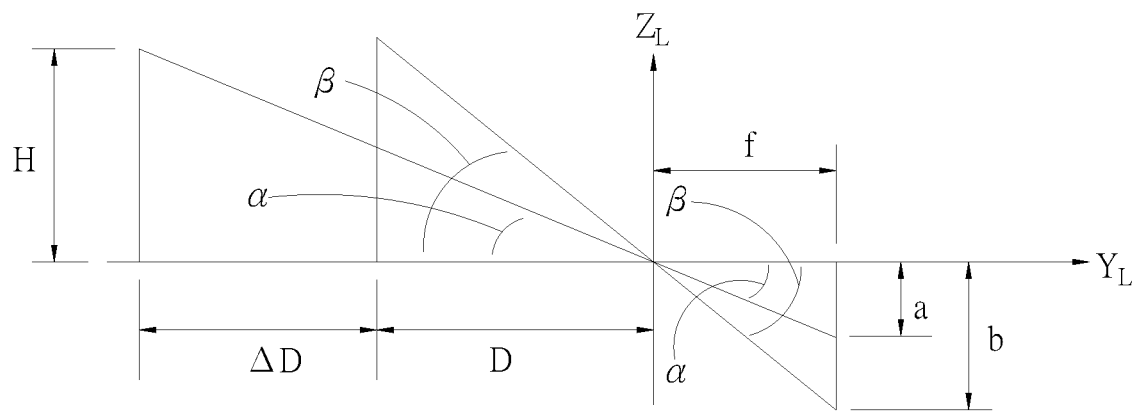
FIG. 18 depicts an illustration diagram of the principle of distance estimation for the driver assistance system according to the present invention.

Please refer to FIG. 18 which depicts an illustration diagram of the principle of distance estimation for the driver assistance system according to the present invention. Herein, with reference to FIG. 18, the distance between the driving vehicle and the vehicle or the pedestrian in the panoramic image is illustrated as follows: The vehicle or pedestrian of the panoramic image projected onto the optical image sensor S is used to have a projection image height a. The height of the panoramic image of the vehicle or pedestrian is H. The principle of the similar triangle is used to obtain the first object distance D. The passing time is Δt. The focal length of the camera lens is f. The vehicle or pedestrian of the panoramic image has a moving distance ΔD. The projection image height of the vehicle or the pedestrian of the panoramic image projected onto the optical image sensor S changes into b. The principle of the similar triangle used to obtain a distance equation is illustrated as follows:

$$\Delta D = \frac{(b-a)}{f} * D = \frac{(b-a)}{b} * H$$

The image processor 30 has a critical range and determines whether a relative distance between the vehicle or the pedestrian of the panoramic image and the driving vehicle is within the critical range according to the aforementioned distance equation. Specifically, when the image processor 30 determines that the relative distance between the vehicle or the pedestrian of the panoramic image and the driving vehicle is outside the critical range, the vehicle or the pedestrian of the panoramic image stays away from the driving vehicle; when the image processor 30 determines that the relative distance between the vehicle or the pedestrian of the panoramic image and the driving vehicle is within the critical range, the vehicle or the pedestrian of the panoramic image approaches the driving vehicle.

Figure 19:
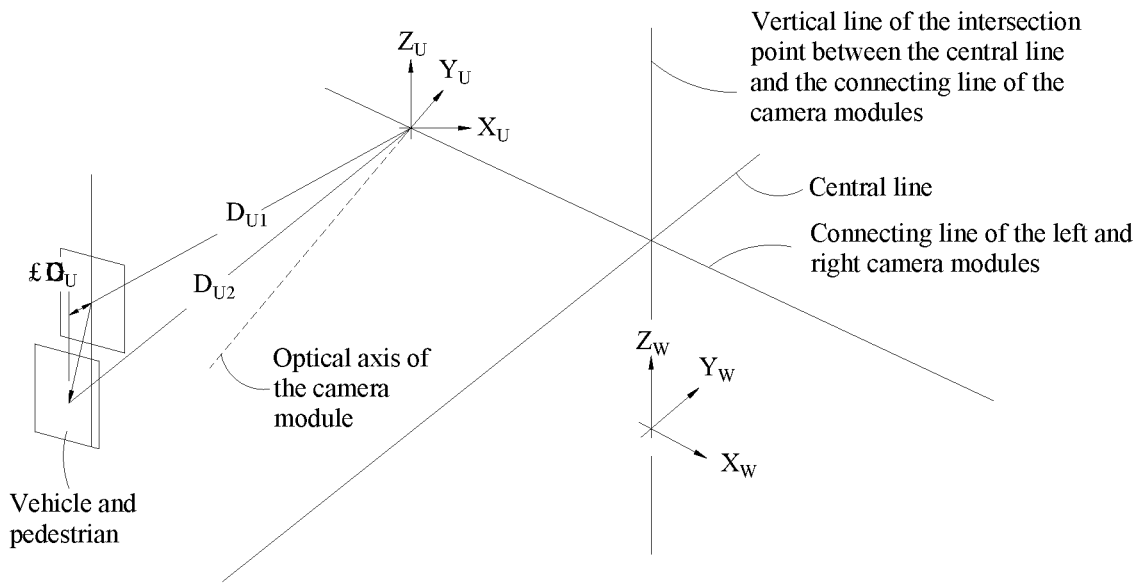
FIG. 19 and FIG. 20 depict illustration diagrams of the principle of peed determination for the driver assistance system according to the present invention.
Figure 20:
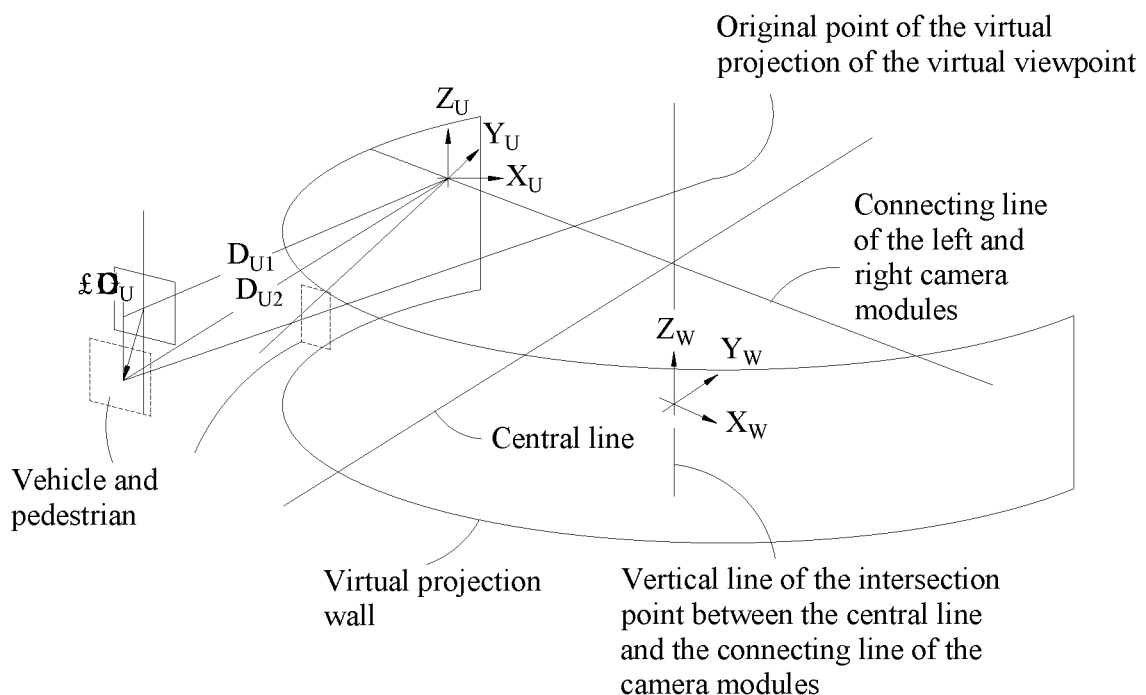

Please refer to FIG. 19 and FIG. 20 which depict illustration diagrams of the principle of peed determination for the driver assistance system according to the present invention. The local coordinate system of the camera module 10 is ($X_{Li}$, $Y_{Li}$, $Z_{Li}$). The optical axis of the camera module 20 coincides with $Y_{Li}$. The original point ($0_{Li}$, $0_{Li}$, $0_{Li}$) of the local coordinate system is located at the position of the optical entrance pupil of the camera module 20, wherein after a vehicle or a pedestrian of interest is identified, it is marked with a minimum inscribed rectangle. The geometric center of the rectangle is used to calculate the object distance $D_{Li}$. The height of the rectangle is assumed to be 1.7M. According to the description of the distance estimation as mentioned above, pictures of consecutive three frames are used in two consecutive time intervals ΔT, thus obtaining the object distance $D_{Li}$. Therefore, $\Delta D_{Li}1$ and $\Delta_{DLi}2$ may be further calculated according to the image height variation of the object projected on the optical image sensor S, thus obtaining the speeds $V_{Li}1$ and $V_{Li}2$.

Specifically, the speeds $V_{Li}1$ and $V_{Li}2$ are determined according to the local coordinate system of the camera module 10, whereas the calculation of the relative speeds in a panoramic image requires the conversion of the local coordinate system of the camera module 10 to the world coordinate system of the panoramic image. The original point ($0_W$, $0_W$, $0_W$) of the world coordinate system ($X_W$, $Y_W$, $Z_W$) is located at the intersection point between the central line of the moving direction of the driving vehicle and the connecting line (vertical to the moving direction of the vehicle body) of the left and right camera modules 10, which is projected onto the position of ground according to the vertical height direction. Therefore, the speeds are converted to $V_W1$ and $V_W2$. If both $V_W1$ and $V_W2$ are greater than 0, the vehicle or pedestrian of interest is determined to be in an approaching state; or if both $V_W1$ and $V_W2$ are smaller than 0, the vehicle or pedestrian of interest is determined to be in a distant state.

The image processor 30 has a critical range and determines whether the relative speed of the vehicle or the pedestrian of the panoramic image and the driving vehicle is greater than or smaller than zero according to the aforementioned speed determination mechanism. Specifically, when the image processor 30 determines that the relative speed between the vehicle or the pedestrian of the panoramic image and the driving vehicle is smaller than zero, the vehicle or the pedestrian of the panoramic image stays away from the driving vehicle; when the image processor 30 determines that the relative speed between the vehicle or the pedestrian of the panoramic image and the driving vehicle is greater than zero, the vehicle or the pedestrian of the panoramic image approaches the driving vehicle.

To sum up, the panoramic image system and the driver assistance system of the present invention provides the driver with a more complete rear-view image through the establishment of the panorama image such that the driver may easily determine the current traffic conditions. Moreover, with the distance estimation and the relative speed determination, the driver may instantly know the relative position of the cars coming behind, thus preventing traffic accidents. In short, the panoramic image system and the driver assistance system of the present invention have the aforementioned advantages which may decrease the occurrence of traffic accidents.

The above description is merely illustrative rather than restrictive. Any spirit and scope without departing from the present invention as to equivalent modifications or alterations are intended to be included in the following claims.

What is claimed is:

1. A panoramic image system, comprising:
at least two camera modules, each of the camera modules comprising:
a camera lens; and
an optical image sensor disposed on an optical axis of the camera lens and taking an image at a rear field of view or at least taking the image at a side field of view or a front field of view to obtain a view image;
at least two display elements respectively electrically connected to each of the optical image sensors to display each of the view images, and each of the view images configured to have an overlapping region; and
an image processor electrically connected to each of the optical image sensors and each of the display elements, receiving each of the view images, and piecing each of the view images into a panoramic image according to each of the overlapping regions;
wherein each of the camera lenses has at least three lenses with refractive power;
wherein each of the camera lenses satisfies the following conditions:

1.0≤$f/HEP$≤10.0;

0 deg≤$HAF$≤150 deg;

0 mm≤$PhiD$≤18 mm;

0≤$PhiA/PhiD$≤0.99; and 0.9≤2($ARE/HEP$)≤2.0;

wherein f is a focal length of the camera lens; HEP is an entrance pupil diameter of the camera lens; HAF is a half maximum field of view of the camera lens; PhiD is a maximum value of a minimum side length of an outer periphery of a lens base perpendicular to an optical axis of the camera lens; PhiA is a maximum effective diameter of the camera lens nearest to a lens surface of an image plane; ARE is an arc length along an outline of the lens surface, starting from an intersection point of any lens surface of any lens and the optical axis in the camera lens, and ending at a point with a vertical height which is a distance from the optical axis to half the entrance pupil diameter.

2. The panoramic image system according to claim 1, wherein each of the display elements selectively displays the panoramic image partially or displays the panoramic image entirely according to a region of interest by observation.

3. The panoramic image system according to claim 1, wherein each of the display elements adjusts brightness of each of the view images according to image brightness of shooting of each of the camera modules.

4. The panoramic image system according to claim 1, wherein a horizontal field of view taken by each of the camera modules is a value between 45 degrees and 220 degrees.

5. A panoramic image system, comprising:
at least two camera modules, each of the camera modules comprising:
a camera lens; and
an optical image sensor disposed on an optical axis of the camera lens and taking an image at a rear field of view or at least taking the image at a side field of view or a front field of view to obtain a view image;
at least two display elements respectively electrically connected to each of the optical image sensors to display each of the view images, and each of the view images configured to have an overlapping region; and
an image processor electrically connected to each of the optical image sensors and each of the display elements, receiving each of the view images, and piecing each of the view images into a panoramic image according to each of the overlapping regions;
wherein each of the display elements is an electrochromic mirror and is electrically
connected to the image processor, and each of the electrochromic mirrors comprises:
a display panel;
a semi-reflecting mirror disposed on the display panel;
an electro-optical switch disposed on the semi-reflecting mirror, wherein the electro-optical switch changes a transmittance thereof according to a control signal of the image processor in order to obstruct a travel route of light or to make the light pass through the electro-optical switch; and
a transparent substrate disposed on the electro-optical switch.

6. The panoramic image system according to claim 5, wherein the transparent substrate is an element that firstly interacts with the light when the light is incident and presents a surrounding environment of the electrochromic mirror.

7. The panoramic image system according to claim 5, wherein each of the electro-optical switches comprises a first substrate, a first transparent conductive layer, an auxiliary electrode layer, an electrolyte layer, an electrochromic layer, a second transparent conductive layer, and a second substrate; the first transparent conductive layer is disposed on the first substrate, the auxiliary electrode layer is disposed on the first transparent conductive layer, the electrolyte layer is disposed on the auxiliary electrode layer, the electrochromic layer is disposed on the electrolyte layer, the second transparent conductive layer is disposed on the electrochromic layer, and the second substrate is disposed on the second transparent conductive layer.

8. The panoramic image system according to claim 7, wherein the first substrate or the second substrate is adjacent to the transparent substrate.

9. The panoramic image system according to claim 7, wherein each of the electro-optical switches further comprises a sealing structure; the sealing structure is disposed between the first substrate and the second substrate and surrounds the first transparent conductive layer, the auxiliary electrode layer, the electrolyte layer, the electrochromic layer, and the second transparent conductive layer.

10. The panoramic image system according to claim 7, wherein materials of the electrochromic layer comprise a transition metal oxide, an intercalated compound, an organic compound, and any combination thereof.

11. The panoramic image system according to claim 5, wherein each of the electro-optical switches comprises a first substrate, a first transparent conductive layer, a light-shielding layer, a second transparent conductive layer, and a second substrate; the first transparent conductive layer is disposed on the first substrate, the light-shielding layer is disposed on the first transparent conductive layer, the second transparent conductive layer is disposed on the light-shielding layer, and the second substrate is disposed on the second transparent conductive layer.

12. The panoramic image system according to claim 11, wherein the first substrate or the second substrate is adjacent to the transparent substrate.

13. The panoramic image system according to claim 11, wherein each of the electro-optical switches further comprises a sealing structure; the sealing structure is disposed between the first substrate and the second substrate and surrounds the first transparent conductive layer, the light-shielding layer, and the second transparent conductive layer.

14. The panoramic image system according to claim 11, wherein materials of the light-shielding layer comprise suspended particles, a polymer dispersed liquid crystal, and any combination thereof.

15. The panoramic image system according to claim 5, wherein when the image processor sends a control signal having a first voltage to each of the electro-optical switches, each of the electro-optical switches obstructs the travel route of the light; when the image processor sends a control signal having a second voltage to each of the electro-optical switches, the light passes through each of the electro-optical switches.

16. The panoramic image system according to claim 15, wherein the image processor adjusts the second voltage according to image brightness of shooting of each of the camera modules in order to adjust the transmittance of the electro-optical switch.

17. The panoramic image system according to claim 15, wherein when image brightness of shooting of the camera module is greater than a threshold value, the image processor sends a control signal having a first voltage to each of the electro-optical switches, each of the electro-optical switches obstructs the travel route of the light, and the display panel displays the panoramic image pieced by the image processor.

18. A driver assistance system, comprising the panoramic image system according to claim 1,
wherein the image processor determines that a vehicle or a pedestrian of the panoramic image approaches or stays away from a driving vehicle according to the panoramic image.

19. The driver assistance system according to claim 18, wherein when the image processor determines that a relative distance between the vehicle or the pedestrian of the panoramic image and the driving vehicle is within a critical range, the vehicle or the pedestrian of the panoramic image approaches the driving vehicle.

20. The driver assistance system according to claim 18, wherein when the image processor determines that a relative distance between the vehicle or the pedestrian of the panoramic image and the driving vehicle is outside a critical range, the vehicle or the pedestrian of the panoramic image stays away from the driving vehicle.

21. The driver assistance system according to claim 18, wherein when the image processor determines that a relative speed between the vehicle or the pedestrian of the panoramic image and the driving vehicle is greater than zero, the vehicle or the pedestrian of the panoramic image approaches the driving vehicle.

22. The driver assistance system according to claim 18, wherein when the image processor determines that a relative speed between the vehicle or the pedestrian of the panoramic image and the driving vehicle is smaller than zero, the vehicle or the pedestrian of the panoramic image stays away from the driving vehicle.

* * * * *